United States Patent
Nielsen

(10) Patent No.: US 9,596,922 B2
(45) Date of Patent: *Mar. 21, 2017

(54) STRAP LIFTER FOR USE BETWEEN TWO PERSONS

(71) Applicant: Corey David Nielsen, Denver, CO (US)

(72) Inventor: Corey David Nielsen, Denver, CO (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/823,948

(22) Filed: Aug. 11, 2015

(65) Prior Publication Data

US 2016/0183665 A1 Jun. 30, 2016

Related U.S. Application Data

(63) Continuation-in-part of application No. 14/463,622, filed on Aug. 19, 2014, now Pat. No. 9,101,202, which is a continuation of application No. 13/466,101, filed on May 7, 2012, now Pat. No. 8,807,403.

(60) Provisional application No. 61/483,650, filed on May 7, 2011.

(51) Int. Cl.
*B65G 7/12* (2006.01)
*A45F 3/14* (2006.01)

(52) U.S. Cl.
CPC .............. *A45F 3/14* (2013.01); *B65G 7/12* (2013.01); *A45F 2003/142* (2013.01); *A45F 2003/146* (2013.01); *Y10T 24/4019* (2015.01); *Y10T 24/4084* (2015.01)

(58) Field of Classification Search
CPC .......... B65G 7/12; A45F 3/14; A45F 2003/14; A45F 2003/142; A45F 2003/146; A61G 7/1049; A61G 7/1051; A01M 31/006; Y10T 24/4019; Y10T 24/4084

USPC .......... 224/157, 184, 258, 904; 24/171, 196; 410/97, 100; 5/625–629; 294/152; 280/1.5, 18

See application file for complete search history.

(56) References Cited

U.S. PATENT DOCUMENTS

| 1,535,208 A | 4/1925 | Drennan |
|---|---|---|
| 1,611,588 A | 12/1926 | Hyde |
| 1,995,439 A | 3/1935 | Tompkins |

(Continued)

OTHER PUBLICATIONS

Shoulder Dolly, Moving Straps—Easier Than a Moving Dolly, http://shoulderdolly.com/, available at least as early as Dec. 2, 2010, pp. 1-2.

(Continued)

*Primary Examiner* — Justin Larson
*Assistant Examiner* — Scott McNurlen
(74) *Attorney, Agent, or Firm* — Pedersen and Company, PLLC; Ken J. Pedersen; Barbara S. Pedersen

(57) ABSTRACT

A strap lifter for use with a harness is shown and described. The harness may have two shoulder straps that support a central, front buckle for use at about the lower, central belly of a user. A generally horizontal buckle strap has a fixed, rigid lower loop beneath a movable, flexible upper loop secured to the front of the buckle strap. The lower and upper loops are generally parallel, and close, to each other. Typically, the distance between the two loops is slightly more than the thickness of a lifter strap which is threaded between the two loops. Preferably, a set of two harnesses is used by two persons standing face-to-face with a single lifter strap between them threaded through both of the buckles.

19 Claims, 19 Drawing Sheets

(56) References Cited

U.S. PATENT DOCUMENTS

| | | | |
|---|---|---|---|
| 2,099,387 | A | 11/1937 | Cohn et al. |
| 2,431,780 | A | 12/1947 | Theal |
| 2,528,078 | A | 10/1950 | Quilter |
| 2,743,497 | A | 5/1956 | Davis |
| 3,293,713 | A | 12/1966 | Gaylord |
| 5,307,967 | A | 5/1994 | Seals |
| 5,497,923 | A | 3/1996 | Pearson et al. |
| 5,588,940 | A | 12/1996 | Price et al. |
| 6,039,376 | A | 3/2000 | Lopreiato |
| 6,213,365 | B1 | 4/2001 | Stocke et al. |
| 6,508,389 | B1 | 1/2003 | Ripoyla et al. |
| 6,641,008 | B2 | 11/2003 | Falzone et al. |
| 6,679,404 | B2 | 1/2004 | Brandt |
| 6,698,632 | B1 | 3/2004 | Turner et al. |
| 6,729,511 | B2 | 5/2004 | Dent |
| 7,331,493 | B2 | 2/2008 | Dent |
| 7,731,069 | B2 | 6/2010 | Lopreiato |
| 8,807,403 | B2 | 8/2014 | Nielsen |
| 9,101,202 | B2 | 8/2015 | Nielsen |
| 2002/0148866 | A1 | 10/2002 | Dent |
| 2005/0263551 | A1 | 12/2005 | Dent |
| 2007/0187445 | A1 | 8/2007 | Krapka |

OTHER PUBLICATIONS

Shoulder Dolly, Products, http://shoulderdolly,com/products-2/, available at least as early as Dec. 2, 2010.

Forearm Forklift Lifting Straps®, http://www.forearmforklift.com/ForearmForkliftLiftingStraps.html, Jun. 22, 2015.

Moving Harness, http://www.forearmforklift.com/MovingHarness.html, Jun. 22, 2015.

Extension Strap, http://www.forearmforklift.com/ExtentionStrap.html, Aug. 4, 2015.

PCT International Search Report and the Written Opinion, Dec. 18, 2012, PCT/US2012/036855, Applicant: Nielsen.

Chinese Examiner's Action (and English Translation), Chinese Patent Application No. 201280022103.7, National Entry of PCT/US2012/036885, Applicant: Corey D. Nielsen.

European Examiner's Action, European Patent Application No. 12781609.8, National Entry of PCT/US2012/036855, Aug. 14, 2015, Applicant: Corey D. Nielsen.

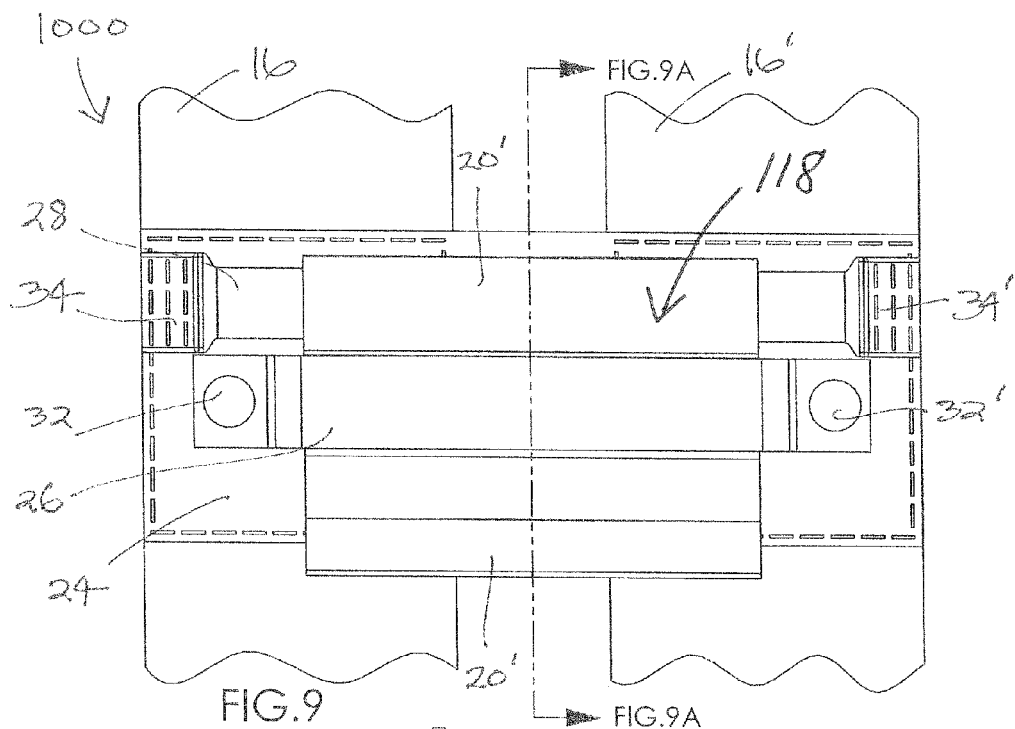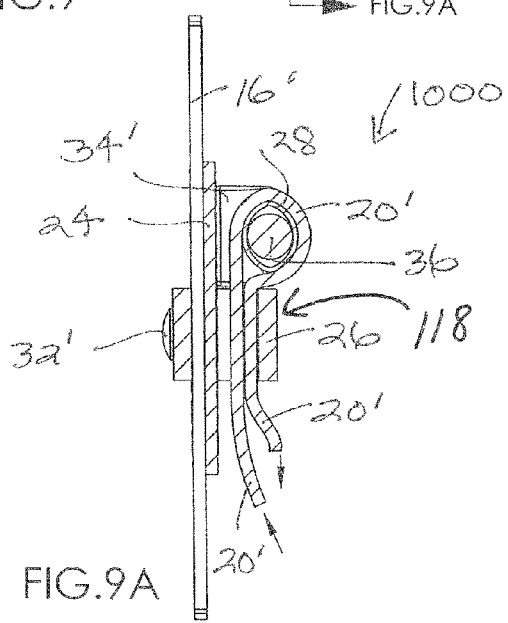

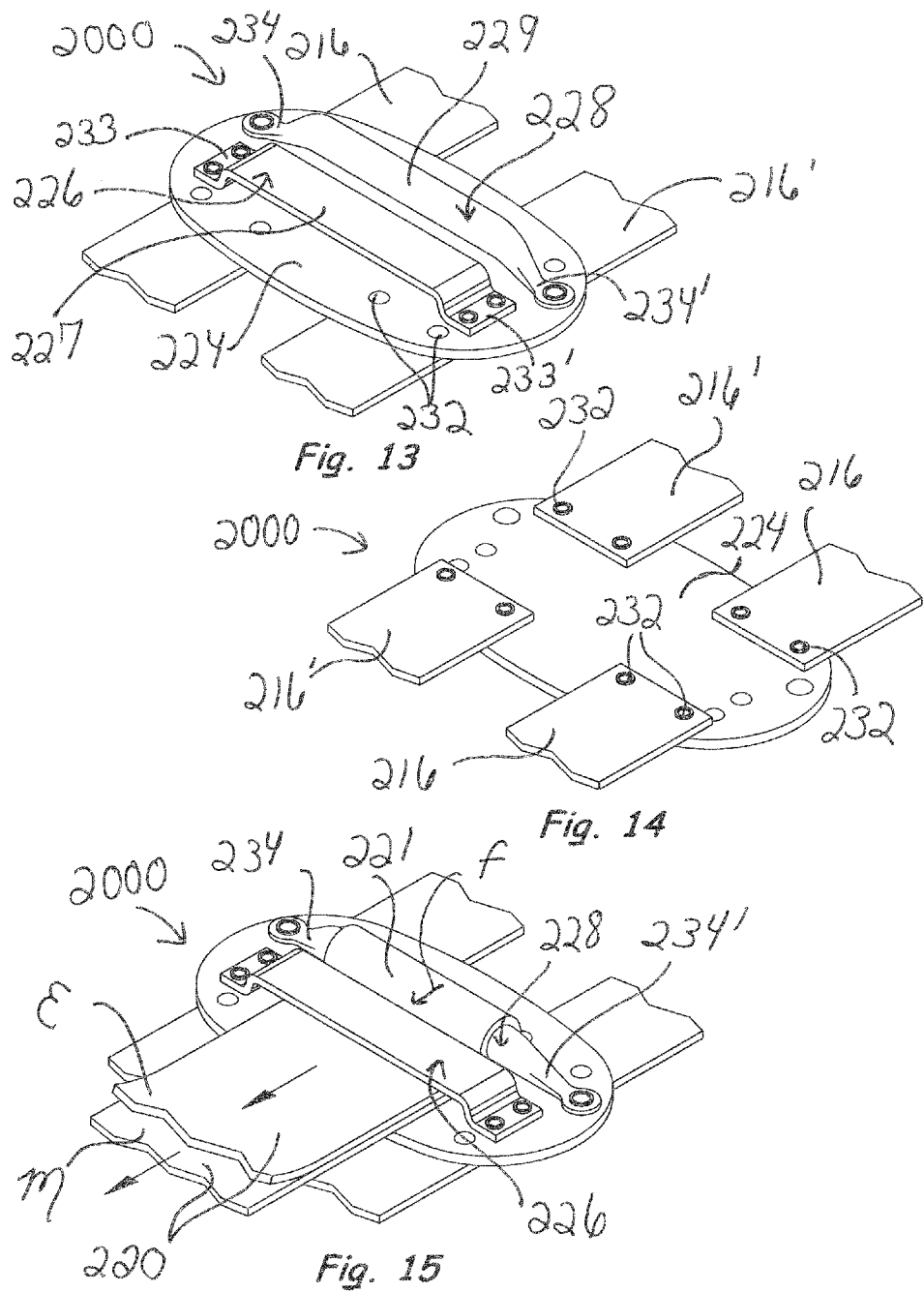

STRAP LIFTER FOR USE BETWEEN TWO PERSONS

BACKGROUND OF THE DISCLOSED TECHNOLOGY

This application is a continuation-in-part of U.S. Non-Provisional application Ser. No. 14/463,622, entitled "Strap Lifter for Use Between Two Persons", filed Aug. 19, 2014, and issuing on Aug. 11, 2015 as U.S. Pat. No. 9,101,202, which is a continuation of U.S. patent application Ser. No. 13/466,101, filed May 7, 2012, and issued on Aug. 19, 2014 as U.S. Pat. No. 8,807,403, which claims priority of provisional patent application Ser. No. 61/483,650, filed on May 7, 2011, entitled "Two Person Lifting System with Middle Strap," the disclosures of which are incorporated herein by reference.

FIELD OF THE DISCLOSED TECHNOLOGY

The disclosed technology relates generally to the delivery/moving/relocation businesses, and more specifically to a set of shoulder harnesses with buckles and central lifter strap for use between two persons to help lift heavy objects, like, for example, home appliances and furniture.

RELATED ART

U.S. Pat. No. 1,535,208 (Drennan) discloses a body lifter harness with a shoulder harness and a central buckle for securing the harness straps and supporting a central strap with a hook.

U.S. Pat. No. 2,431,780 (Theal) discloses a load carrying pair of straps connected by a central strap with a buckle, each load carrying strap being secured to a shoulder harness of a person.

U.S. Pat. No. 6,508,389 (Ripoyla et al.) discloses a harness for lifting. The harness having a bottom strap which is linked together with the bottom strap of another, identical harness at a cross-over point.

U.S. Pat. No. 6,641,008 (Falzone et al.) also discloses a shoulder strap harness lifter for two persons with a central strap being connected to each harness by the shoulder straps each being threaded through one of a series of openings in the central strap.

U.S. Pat. No. 6,729,511 (Dent '511) discloses a lifting harness for the shoulders of two persons with a wide, conventional central tension buckle and a web lift strap threaded through the buckle.

U.S. Pat. No. 7,331,493 (Dent '493) discloses a lifting harness similar to the one disclosed in Dent '511 above, except in Dent '493 the shoulder straps are threaded through holes in the central buckle, versus the shoulder straps having carabiners for supporting the central buckle in Dent '511. Dent '493, then, discloses a one-piece buckle that is loose on the webbed harness.

An embodiment similar to the disclosure of Dent '493 is marketed as the SHOULDER DOLLY® by Nielsen Products, LLC of Sandy, Utah, USA. (SHOULDER DOLLY® is a registered US trademark owned by TDT Moving Systems, Inc. of Colorado, USA.)

SUMMARY

A strap lifter system, and methods of using the system, are disclosed. The strap lifter system may be used between two persons, to help lift and maneuver heavy objects, like, for example, home appliances and furniture. The preferred system comprises a central lifter strap carried by preferably two shoulder-harnesses each comprising a front, central buckle, wherein the central buckle operates by means of a flexibly-mounted, and/or flexible or partially-flexible, pinch member that moves to capture the central lifter strap in the buckle in a desired position.

In certain embodiments, the subject strap lifter system has a pair of shoulder harnesses with front, central buckles, and a central lifter strap of strong nylon web extending between, and captured by, the central buckles of the two shoulder harnesses that are worn by two people. Each shoulder harness may comprise two shoulder loops, which cross and connect at the back of the harness, and which also connect at their fronts to the central buckle to hold the buckle centrally on the user's body at the user's lower central torso or "lower central belly". Each shoulder loop may extend from the back of the person, preferably at the "x" crossing/connection, over one shoulder and then down to the central buckle and then up under the opposite shoulder, and rearward to the "x" crossing. Each shoulder loop may be formed in a loop from a single length/piece of web, starting at the "x" crossing for the high, center back of the user, and also terminating there. To make certain embodiments of a harness, the ends of the single length of web are overlapped in end-to-end fashion, the overlapped ends are placed over the midpoint of the looped single length in perpendicular fashion, and all three layers are sewn together with a strong nylon thread to make the "x" crossing of the two shoulder straps.

The front, central buckle may be of various designs. For example, the buckle may be formed mainly of web, plus preferably one or more reinforcing member(s) (to keep the main body of the buckle from bending/folding), and the upper and lower loops of the pinch system for capturing the central strap. For example, at a distance in the looped "single length" (forming each shoulder loop), generally opposite the "x" crossing, a short buckle strap is sewn perpendicularly to the front of each shoulder strap. The buckle strap is a short length of strong nylon web that is overlapped and sewn at each end to the front of one of the shoulder straps. This way, the short buckle strap determines the spacing between the shoulder straps for the central, front buckle for use at about the lower, center belly of the user.

Besides the short buckle strap, the central, front buckle has an optional, generally horizontal reinforcing bar riveted perpendicularly to the back of each shoulder strap. Generally the reinforcing bar is located and secured so it is at about the center of the buckle strap, but on the opposite sides of the shoulder straps. The reinforcing bar helps make the central, front buckle more rigid and stronger, and better secured to the short buckle strap.

Other styles of the front, central buckle may be used, for example, using main bodies/back-plates other than the short buckle strap and optional reinforcing bar, and using fasteners between the buckle portions and between the buckle and the shoulder straps other than sewing and rivets. For example, a rigid back-plate formed of polymer or metal may be used instead of reinforced web/fabric. For example, bolts, clips, ties, adhesives, crimps, welding, and/or other fasteners may be used to connect portions of the buckle and/or the buckle to the shoulder straps, as long as said fasteners are durable and reliable enough to hold a large load placed on the captured central lifter strap, and, hence, on the buckle and shoulder straps.

On the front of the buckle strap, generally co-extensive with the reinforcing bar of the preferred embodiment, is a fixed, rigid lower loop of the buckle, or, in other words, a rigid "lower member" or "lower bar" that is immovable relative to the short buckle strap (or other back-plate) on which it is mounted. Conveniently, the rigid lower loop may be secured to the front of the buckle strap by the same rivets which secure the reinforcing bar to the back of the shoulder straps.

Also secured to the front of the buckle strap, just above and generally parallel to, the rigid lower loop, is a movable, flexible upper loop, or, in other words, an "upper pinch member" or "upper pinch bar" that moves by means of flexibility, for example, being flexibly mounted to the buckle strap (or other back-plate), and/or being partially flexibly or less-preferably entirely flexible. The movement of the upper loop is relative to the short buckle strap (or other back-plate), but most importantly, relative to the lower loop, to pinch the central lifter strap between the upper and lower loops.

Typically, the upper loop is spaced-apart from the lower loop a distance slightly greater than the thickness of the central lifter strap, for example, spaced-apart a distance about 5-100 percent greater (and more preferably about 20-60 percent greater) than the thickness of the central strap, when no load is applied to the central lifter strap. For example, the upper loop may be spaced-apart from the lower loop a distance of 3/16 inch for a central lifter strap about 1/8 inch thick, when no load is applied to the lifter strap.

Preferably, the middle part of the upper loop may be a horizontal cylinder made of nylon fabric which receives within it a reinforcing rod/bar/tube, or, the upper loop may exist as a flatter envelope which is flexible enough to accept the reinforcing rod/bar/tube. The rod/bar/tube is preferably rigid, or less preferably generally rigid. The ends of the upper loop, which are secured to the buckle strap near its side edges, respectively, are flexible so the upper loop is movable relative to the buckle strap and the fixed lower loop. In such embodiments, the upper loop is flexible at its ends, at and near the connection point where the upper loop is connected to the buckle strap, but the central portion of the upper loop between the flexible ends, is reinforced by said rod/bar/tube to be rigid or substantially rigid at said central portion. Preferably, 60-98 percent of the length, or more preferably 75-95 percent of the length, or most preferably 80-90 percent of the length, of the upper loop is rigid, with the remainder being flexible for movement to pinch the central strap against the lower loop.

In use, one end of the central lifter strap is first threaded up through the rigid lower loop, passed up, over the top of, and partly around, the flexible upper loop, and back down and through the rigid lower loop, preferably in front of the first pass of the lifter strap through the rigid lower loop. This way, when no load is applied to the lifter strap, its length may be easily adjusted by the user by loosening the lifter strap's end up and over the flexible upper loop to un-do the buckle, and gently pushing and/or pulling on the lifter strap to adjust the length of it. After adjustment, when a load is applied to the lifter strap, the central part of the movable, flexible upper loop is pulled down and pinches the lifter strap on itself and on the upper, inside edge of the rigid lower loop. This way, the lifter strap is restrained or "captured", in the buckle, and securely fixed for use in lifting heavy objects.

Preferably, two harnesses worn by two persons standing face-to-face are employed with one central lifter strap between them to place under and help lift heavy objects. However, one person with the harness can use the central lifter strap to secure large, ungainly loads that are still light enough to lift safely. Also, more than one lifter strap may be secured to one person when the harness for the person is fitted with several buckles. Also, the buckle may be effectively provided by a harness with an integrated buckle strap that is secured to a fixed point, like on a post or wall, and a lifter strap threaded through the buckle and operated by one or more persons not connected to the harness to pull or lift an object on the lifter strap.

BRIEF DESCRIPTION OF THE DRAWINGS

FIG. 9 is a further enlarged front view of the embodiment depicted in FIGS. 7 and 8. FIG. 9A is a side cross-sectional view along the line 9A-9A in FIG. 9.

FIG. 13 is a front bottom perspective view of an alternative buckle, having an upper loop with at least one flexible portion, and most preferably two flexible ends, for use in a lifting harness.

FIG. 14. Is a back bottom perspective view of the buckle of FIG. 13.

FIG. 15 is a front bottom perspective view of the buckle of FIGS. 13 and 14, with a lifting strap installed therein.

DETAILED DESCRIPTION OF SEVERAL EMBODIMENTS OF THE DISCLOSED TECHNOLOGY

Referring to the Figures, there are shown several, but not all, embodiments of the disclosed technology.

Figure 1:
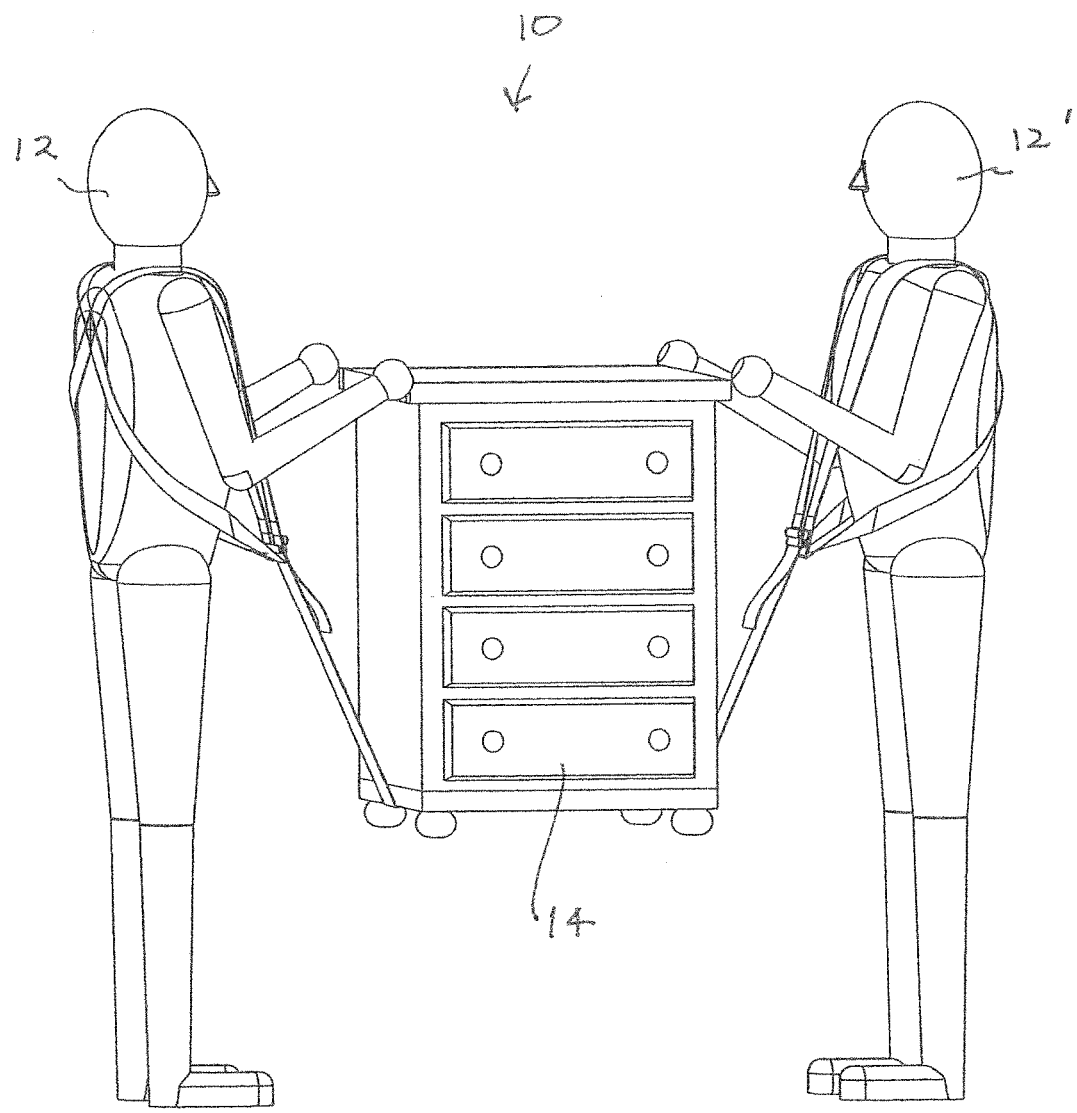
FIG. 1 is a side perspective view of one embodiment of the disclosed technology in use by two persons.

FIG. 1 shows one embodiment 10 of the disclosed technology in use by two persons 12 and 12' to help lift dresser 14. One may understand from FIG. 1 that all of the weight of the dresser 14 is supported by the central lifter strap, and, hence, the central buckle and the shoulder harness. The users' hands are at or above the top edges of the dresser to stabilize the dresser from tipping. It may be noted that the central lifter strap is preferably only a single strap that extends underneath and along the bottom of the object to be lifted. This is preferred because it helps the users maintain a centralized support and lifting system, with all of the preferred single central lifter strap, and the central single buckle of each person's harness, centered relative to the lifted object and relative to the wearers.

Figure 2:
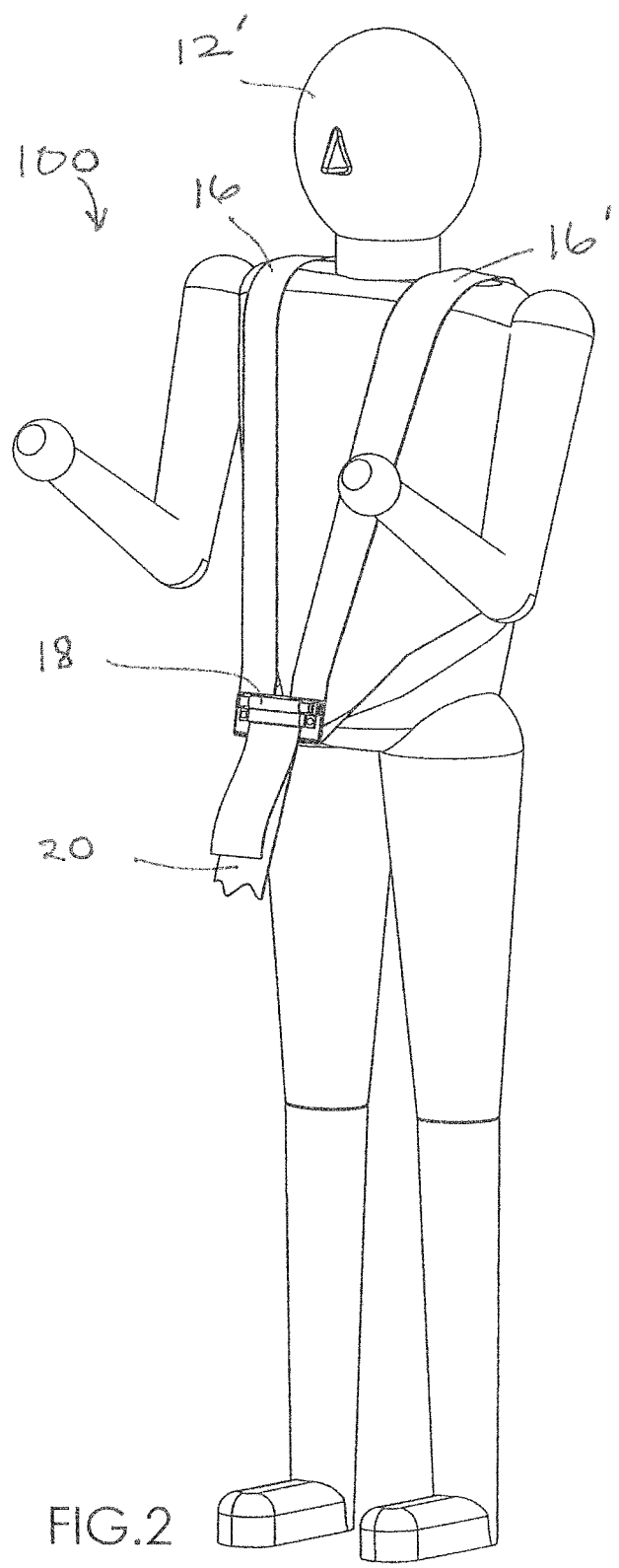
FIG. 2 is a schematic, front perspective view of another embodiment of the disclosed technology on a person, but showing only part of the central lifter strap.

FIG. 2 shows a front perspective view of another embodiment 100 of the disclosed technology on person 12', this embodiment 100 having shoulder straps 16 and 16' supporting central buckle 18 which has center strap 20 or "central lifter strap" (shown in part) threaded through buckle 18.

Figure 3:
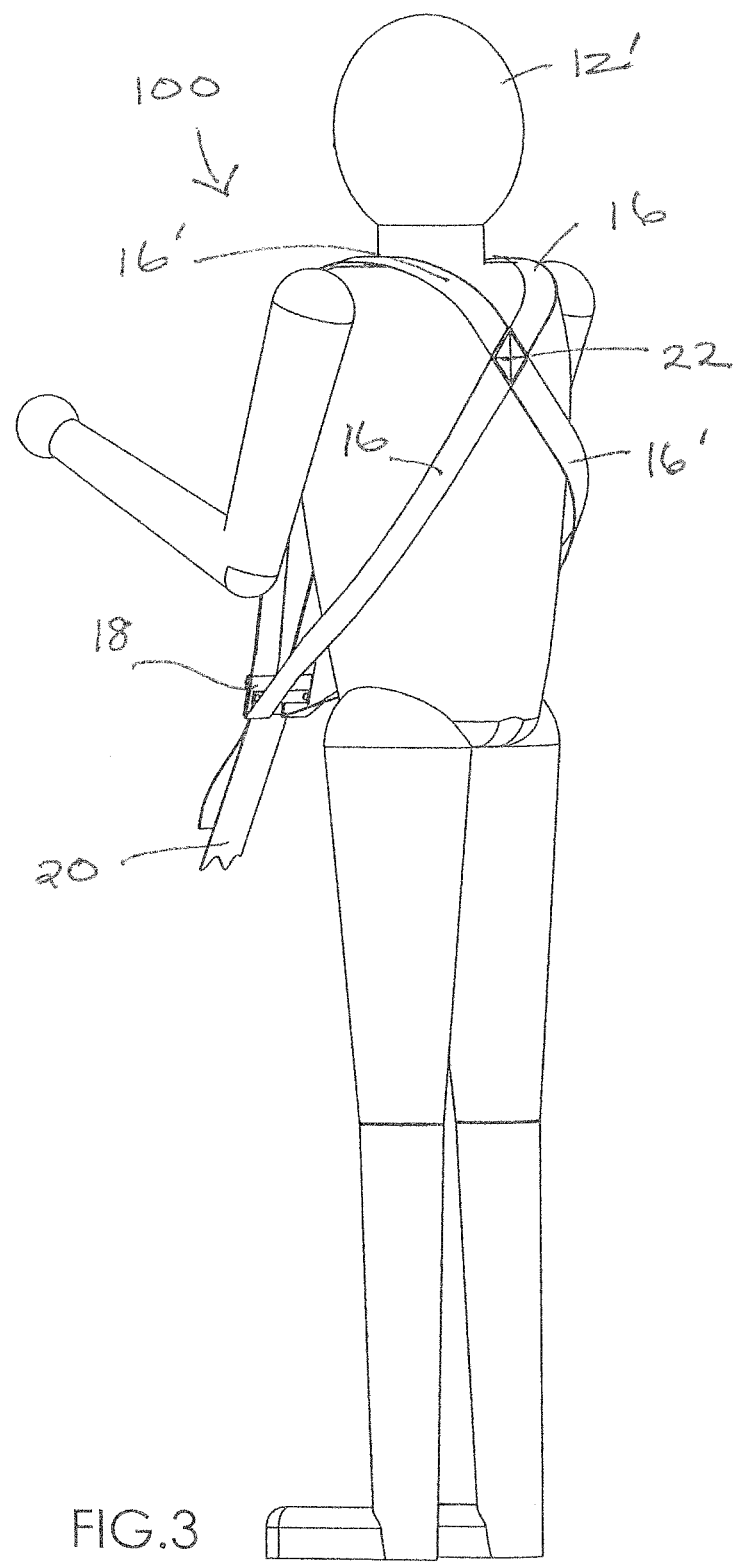
FIG. 3 is a rear perspective view of the embodiment depicted in FIG. 2.

FIG. 3 shows a rear view of FIG. 2. From this Figure it is clear that straps 16 and 16' cross in the back to make an "x" connection 22.

Figure 4:
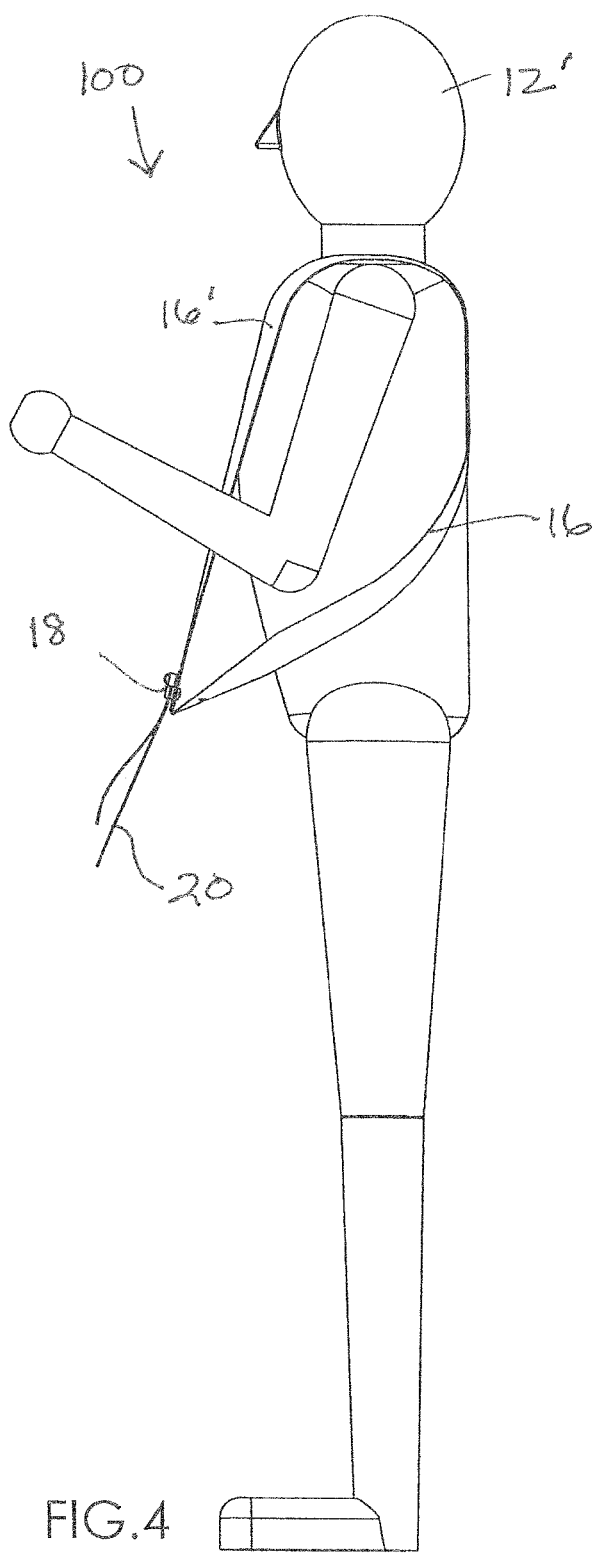
FIG. 4 is a side view of the embodiment depicted in FIGS. 2 and 3.

FIG. 4 shows a left side view of the embodiment 100 depicted in FIGS. 2 and 3. From this Figure it is clear that buckle 18 is employed at about the lower, center belly of the user.

Figure 5:
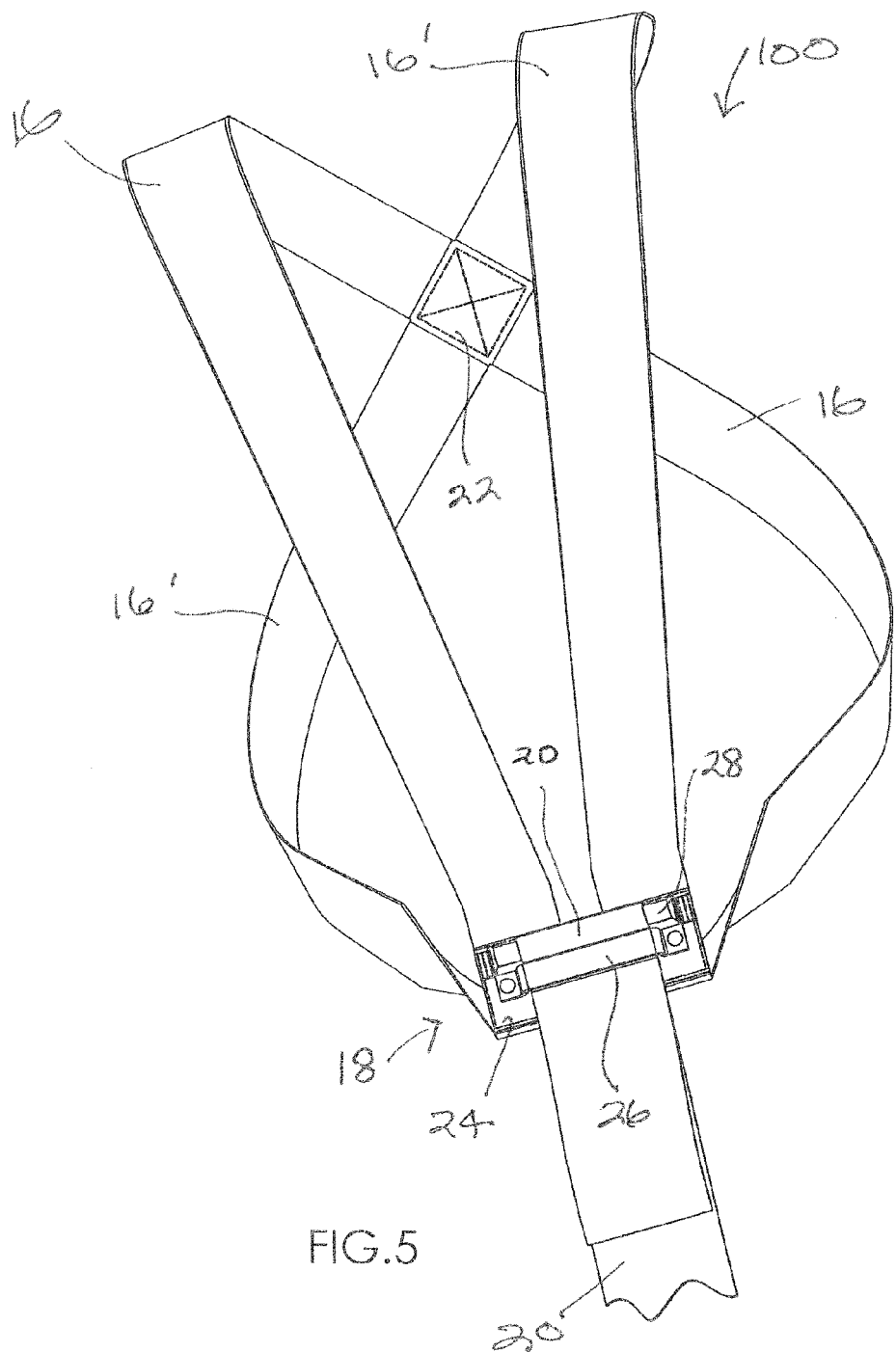
FIG. 5 is a schematic, front perspective view of the embodiment depicted in FIGS. 2-4, but without the person.

FIG. 5 shows the embodiment 100 in a front, top perspective view. From this Figure there is enough resolution to clearly see short buckle strap 24, fixed, rigid lower loop 26 and movable, flexible upper loop 28. Also, it is clear from this Figure that central lifter strap 20 passes first up through lower loop 26, then up behind, over (forward) and down partly around upper loop 28 before passing down through lower loop 26.

Figure 6:
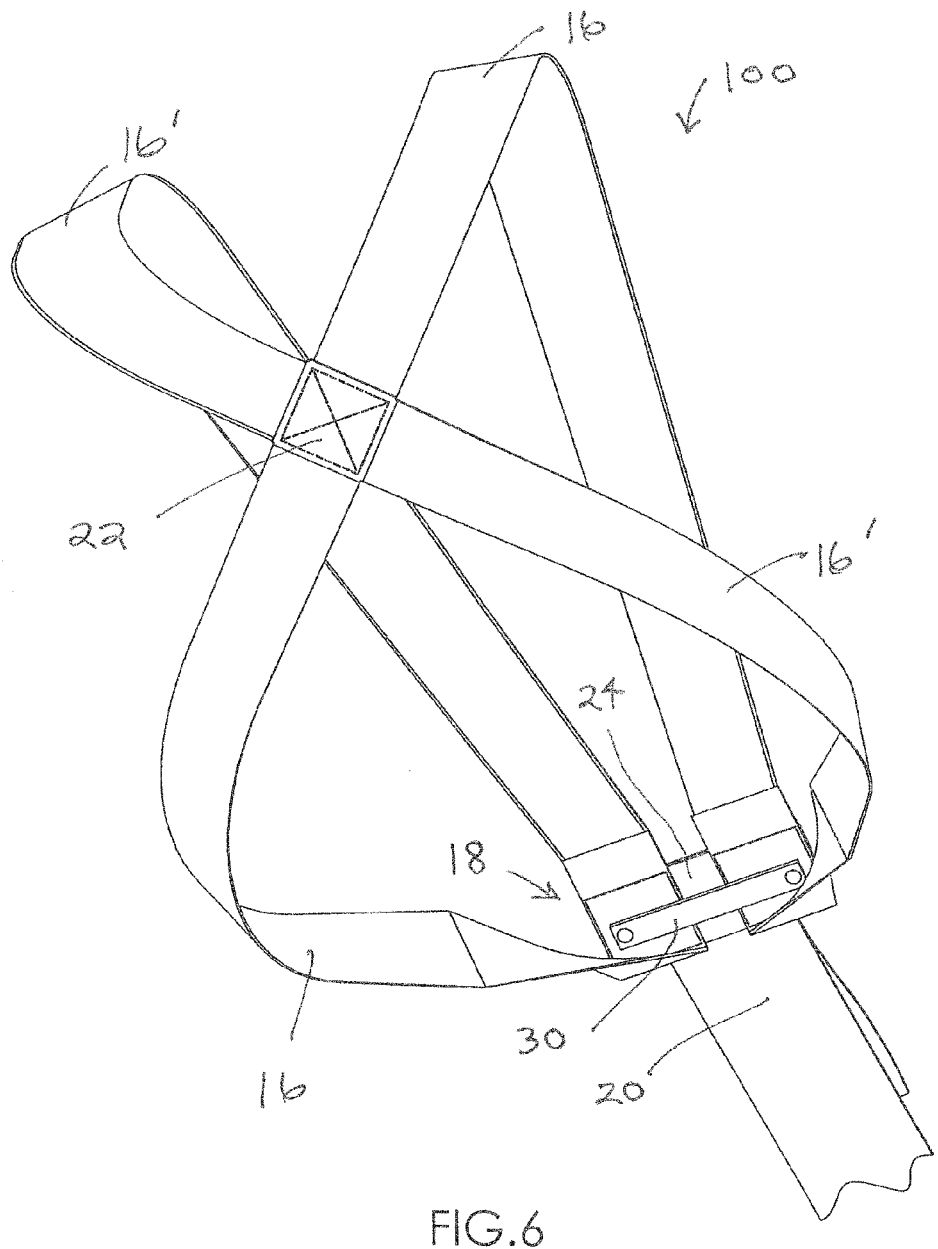
FIG. 6 is a back perspective view of the embodiment depicted in FIGS. 2-5.

FIG. 6 shows the rear view of FIG. 5, in which reinforcement bar 30, approximately co-extensive with fixed, rigid lower loop 26, but on the back sides of shoulder straps 16 and 16', is now clearly visible.

Shoulder straps 16 and 16' need not be present in the "x" connection embodiment. Instead, they may not be connected and each may exist separately at one side of the harness. Also, besides shoulder straps 16 and 16', the subject harness may be embodied in a belt for around the waist of a user. In such an embodiment, the front of the belt may serve as the buckle strap 24. In another embodiment, another garment, like an apron, may serve as the harness and buckle strap, with this structure integrated into the garment.

Figure 7:
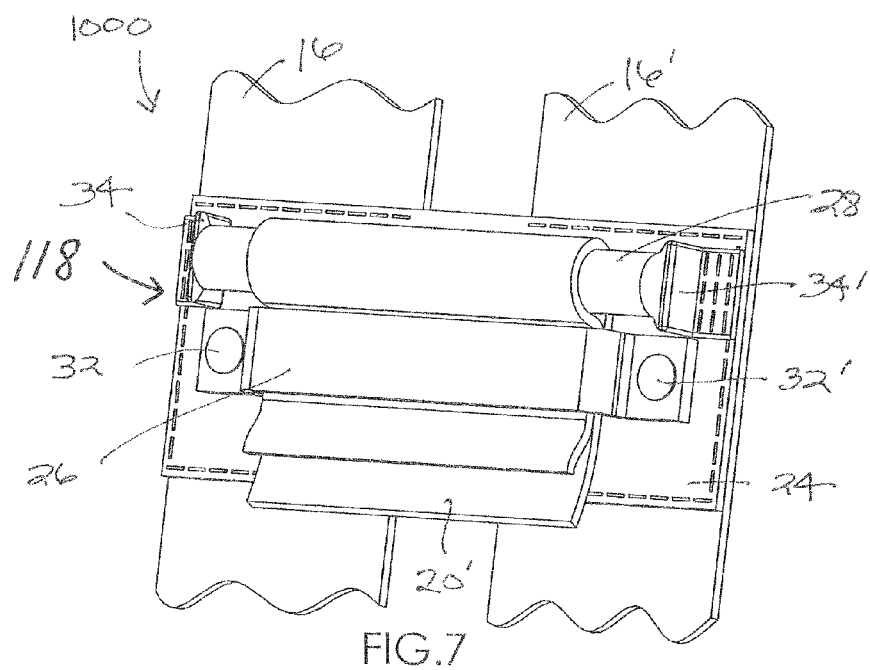
FIG. 7 is an enlarged, schematic, front perspective view of the central, front buckle of another embodiment of the disclosed technology.

FIG. 7 shows a front perspective view of another embodiment 1000 of the disclosed technology, including buckle 118. In this enlarged Figure an abbreviated schematic portion of central lifter strap 20' is shown threaded twice through fixed, rigid lower loop 26 and once partly around movable, flexible upper loop 28. The fixed ends of lower loop 26 are secured to short buckle strap 24 by rivets 32 and 32'. Movable, flexible ends 34 and 34' of upper loop 28 are secured to short buckle strap 24 by several rows of sewing thread. Preferably, upper loop 28 is made of strong fabric which flexes and bends easily at both its ends.

If upper loop 28 is made of thicker, softer material, even with no load applied to central lifter strap 20', the bottom of upper loop 28 may lightly touch the top of lower loop 26. In this embodiment, the upper and lower loops still need to be spaced so that the central lifter strap 20' may be conveniently pushed between the loops to be threaded through the buckle.

Figure 8:
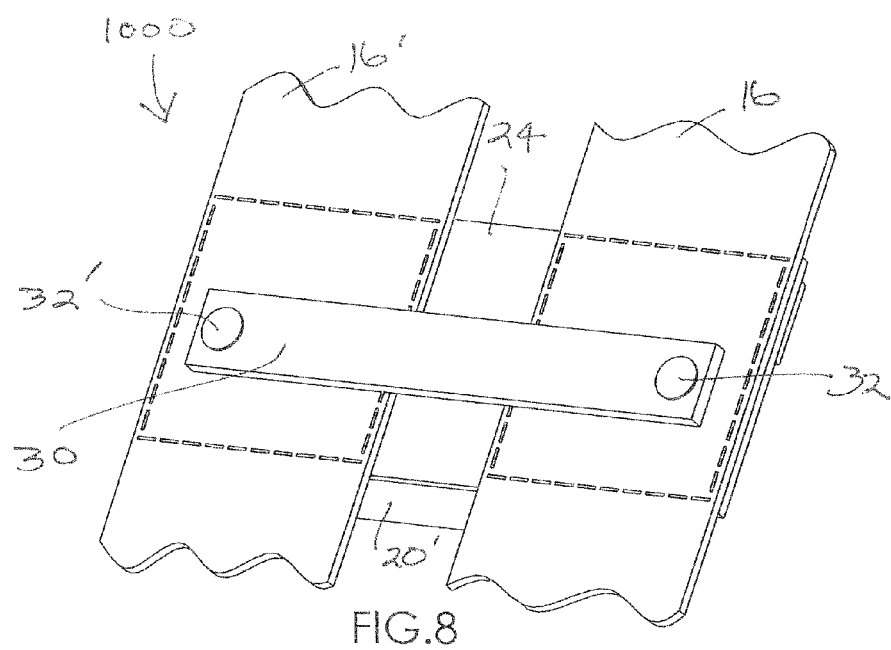
FIG. 8 is a back perspective view of the embodiment depicted in FIG. 7.

FIG. 8 shows a rear view of FIG. 7. From this Figure it is clear that rivets 32 and 32', which secure lower loop 26 to buckle strap 24, are the same rivets which secure optional reinforcement bar 30 to the back sides of shoulder straps 16 and 16'.

FIG. 9 shows a front view of embodiment 1000. In this Figure the flexible ends 34 and 34' of upper loop 28 are clearly shown, stitched to the front of short buckle strap 24. FIG. 9A shows embodiment 1000 in side cross-section along the line 9A-9A in FIG. 9. In this Figure the reinforcement rod 36 within flexible upper loop 28 is shown for the first time. Preferably, rod 36 is made of a rigid and strong material like metal, wood or plastic. Also, from this Figure it is clear that upper loop 28 (that is, the web/cloth of the loop 28) flexes and changes shape to become more oval than round to help pinch central lifter strap 20' against itself and the top edge of rigid lower loop 26 to secure strap 20' in the buckle. Also, because the ends 34 and 34' of upper loop 28 are also flexible, when a load is applied to lifter strap 20', upper loop 28 is pulled down, so it moves down relative to lower loop 26 to become closer to it, which also assists in the pinch pressure on lifter strap 20'. Thus, it may be understood from the drawings, that, while the main body of the flexible upper loop 28 may be flexible material, the reinforcement rod 36 keeps a central portion of the loop 28 in a straight or substantially straight form, that is, preventing any, or alternatively preventing significant, bending or flexing of that central portion. Thus, in FIG. 9, the loop 28 portion in which the rod 36 lies is straight, with the loop fabric optionally being pulled to be oval in cross-section, but the loop 28 portions that are not reinforced (the flexible ends 34, 34') flex to allow the central strap 20' to pull the upper loop 28 toward the lower loop 26 to pinch the strap 20' therebetween.

Figure 10:
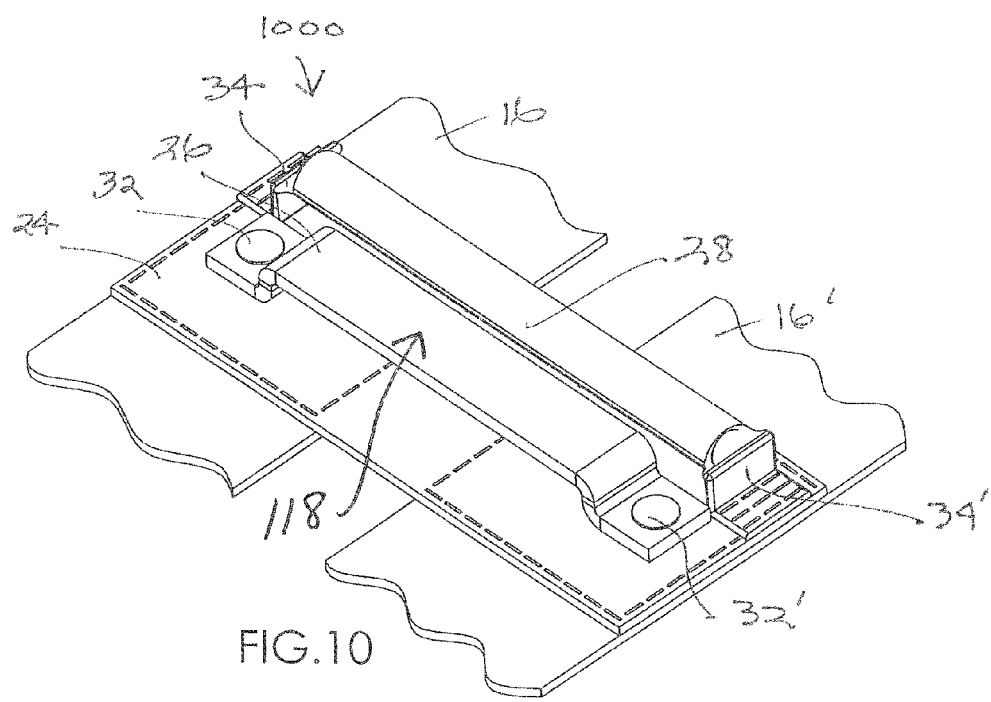
FIG. 10 is a side perspective view of the embodiment depicted in FIGS. 7-9A, but without the central lifter strap.

FIG. 10 shows embodiment 1000 in a side perspective view, without central lifter strap 20' present.

Figure 11:
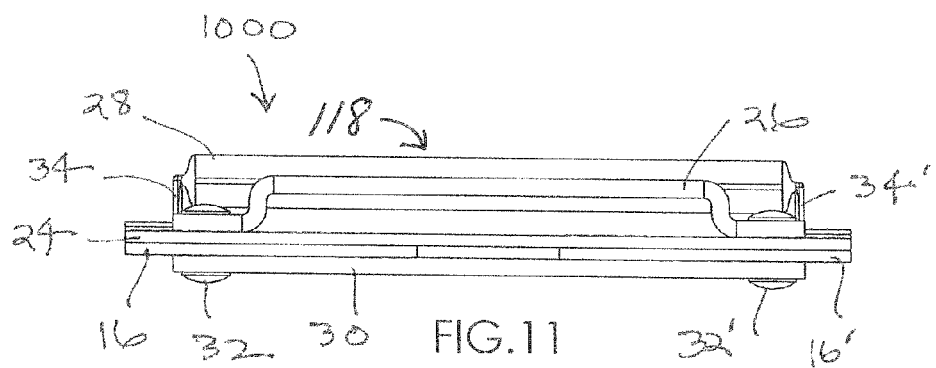
FIG. 11 is a bottom view of the embodiment depicted in FIG. 10.

FIG. 11 shows embodiment 1000 in a bottom view.

Figure 12:
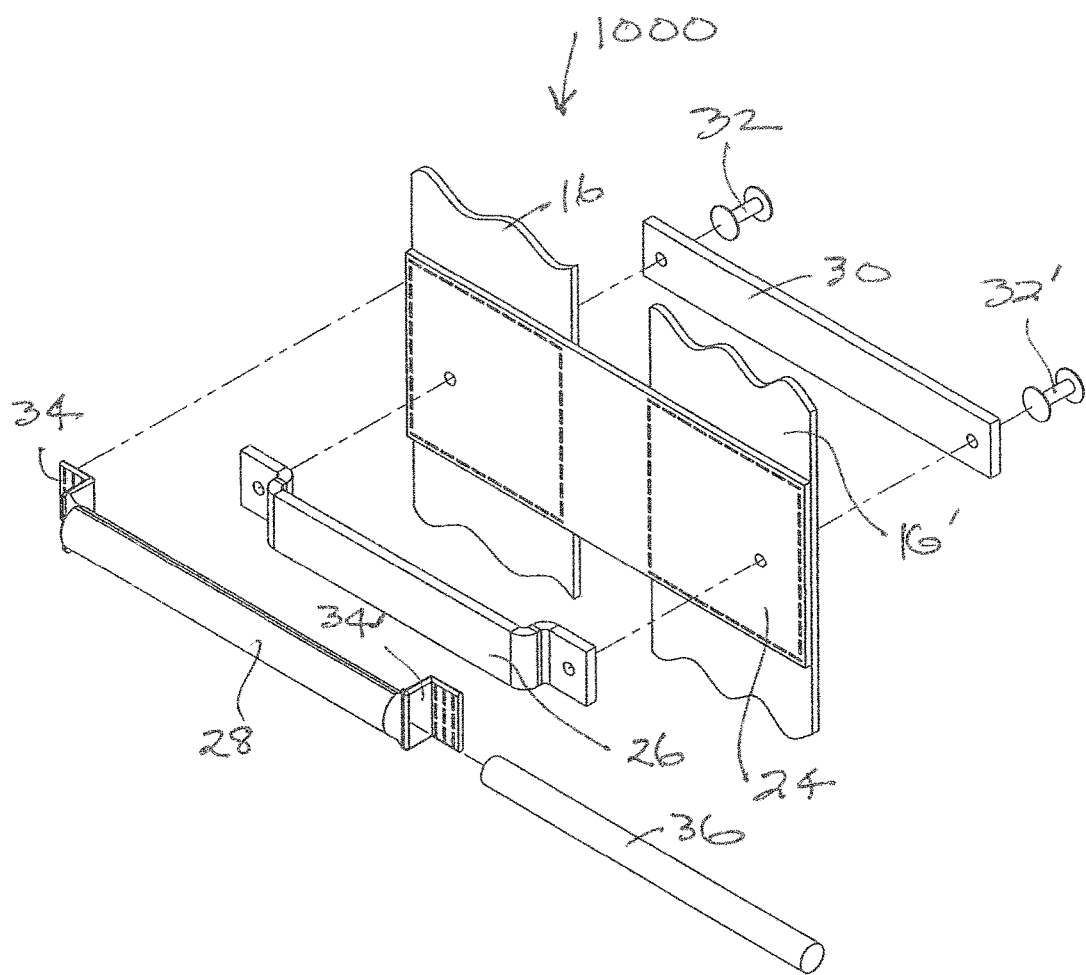
FIG. 12 is a side perspective exploded view of the embodiment depicted in FIGS. 7-11.

FIG. 12 shows embodiment 1000 in a side perspective exploded view.

FIGS. 13-15 illustrates an alternative embodiment of a system 2000 comprising central buckle 218 that has many/most features in common with, and may be used the same or similarly as, buckles 18 and 118. Buckle 218 illustrates certain alternative materials and connection means. A back-plate 224 is connected to straps 216, 216', which may be shoulder harness straps, by rivets or other fasteners 232. The back-plate 224 may be formed of rigid polymer, metal, a composite, or other durable and preferably non-bending material(s). The shape of the back-plate 224 as drawn is oval or oblong, but it may be other shapes, for example, rectangle, round, or polygonal. The lower loop 226 is a rigid bar/plate bent/formed and attached at its ends 233 and 233' to the back-plate 224 so that the central portion 227 of the loop 226 is spaced from the front surface of the back-plate 224. The upper loop 228 is parallel (or generally parallel) to the lower loop 226 and also attached as its ends 234, 234' to the front surface of the back-plate 224, so that the central portion 229 of the loop 228 is spaced from the front surface of the back-plate 224, as discussed above for other embodiment(s) and for the same reason(s) as discussed above. The central portion 229 of upper loop 228 is rigid or substantially rigid, for example, due to the central portion 229 being formed of a rigidity/density, and/or comprising reinforcement member(s), that make it rigid, or at least much more rigid than flexible ends 234, 234', so that said pinching occurs reliably and securely, rather than the forces bending or misshaping the upper loop central portion to a condition wherein it does not pinch the central lifter strap or only pinches a small portion of the width of the central lifter strap.

As shown in FIG. 15, a central lifter strap 220 may be "threaded" or "passed" through the lower loop 226, and around the upper loop 228 (see portion 221 extending part way around upper loop 228). Typically, this is done by "threading" an end of the strap 220 through the buckle 218, so that the end portion E of the strap 220 is forward from the main portion M of the strap 220. The user adjusts the overall length of the main portion M that is placed underneath an object to be lifted, for example, by holding the upper loop 228 central portion 229 away from the lower loop 226, and adjusting/sliding the strap 220 end E and/or main body M relative to the buckle 218, as needed to adjust what portion of the strap 220 will be captured in the buckle 218. Then, after this adjustment of the strap 220 in the buckle, the user can: 1) tug the strap 220 downward (arrows in FIG. 15), to tighten the capture by means of portion 221 pulling the upper loop down (see arrow F), via flexible ends 234, 234', to pinch the strap 220 in the buckle, before the user begins lifting the load placed on the central strap (which tends to further tighten the capture of strap 220 in the buckle); or 2) the user may proceed to lift the load placed on the central strap, which tends to automatically and immediately tighten the capture of strap 220 in the buckle, in effect, by the same means of portion 221 pulling the upper loop down (see arrow F), via flexible ends 234, 234', to pinch the strap 220 in the buckle 218.

Figure 16:
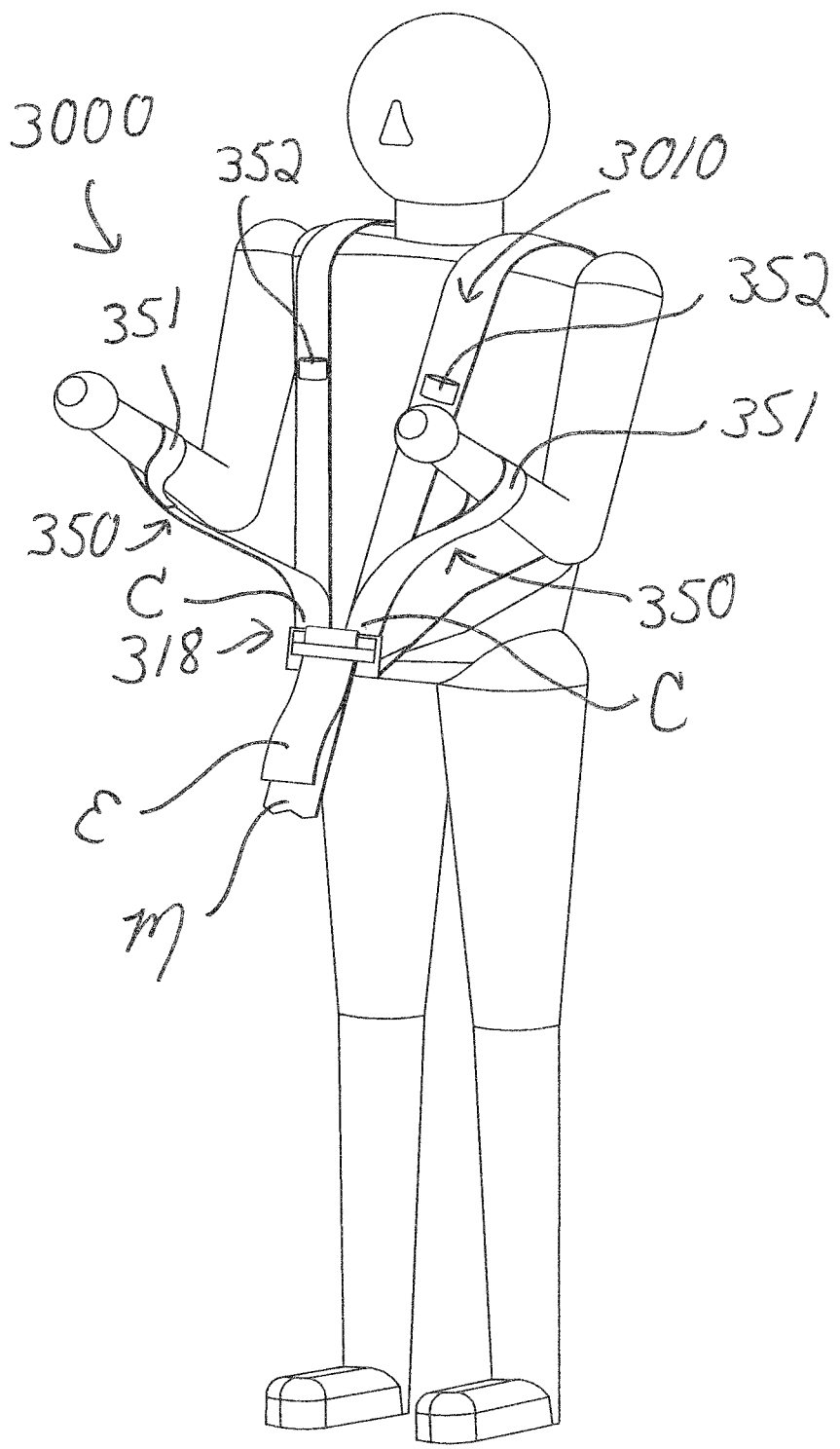
FIG. 16 is a front perspective view of an alternative lifting harness system, having a shoulder harness, a front, central buckle, and two arm loops, installed on a user.

FIG. 16 illustrates a shoulder harness system 3000 having buckle 318, which is structured similarly and operates the same or similarly as buckles 18, 118, and 218, and which is installed in a front, central location on shoulder harness 3010 by connecting the front portion of the right and left shoulder loops 316, 316'. Rear portions of the shoulder loops 316, 316' connect to each other at an x-connection 322 at the back of the harness 3010, and the front portions of the loops 316, 316' connect to the buckle 318 to form a front lower portion of the harness 3010. As discussed before, the buckle 318 is positioned so that it is against a lower, central portion of the user's "belly" or torso, centered between the right and left sides of the user. This keeps the weight of the lifted object centered at the front-to-rear centerline of the harness 3010 and on/against the user's torso, rather than distanced to the right or left of the harness and/or the right or left of the user. Thus, weight on the preferred single central lifter strap is supported by the preferred single, front, central buckle 18, 118, 218, 318, and that weight is distributed, in many embodiments and/or in many uses, equally to both shoulders and to center of the user's back.

System 3000 also includes two arm loops 350 that are mechanically connected to the buckle and/or to the harness 3010 at a connection C at or very near, and preferably above, the buckle 318. Preferably, the arm loops do not attach directly to the central lifter strap 20, but rather preferably attach directly to the buckle and/or the should loops at or above the buckle. For example, the right and left arm loops 350 may be fixed to the back-plate of the buckle and/or to the straps of the harness within a short distance from the buckle (e.g. at 0-5 inches, or preferably 0-3 or 0-2 inches, from the top end of the buckle). This way, the arm loops 350 properly extend upward from the buckle or near-buckle region, so that the arm loops on the user's arms may be lifted up to support the buckle (or the harness straps very close to and above the buckle), and therefore, support some or all of the load that is on the buckle due to the weight on the central lifter strap 20 (main strap M). Use and operation using the arm loops is further discussed below.

Figure 17:
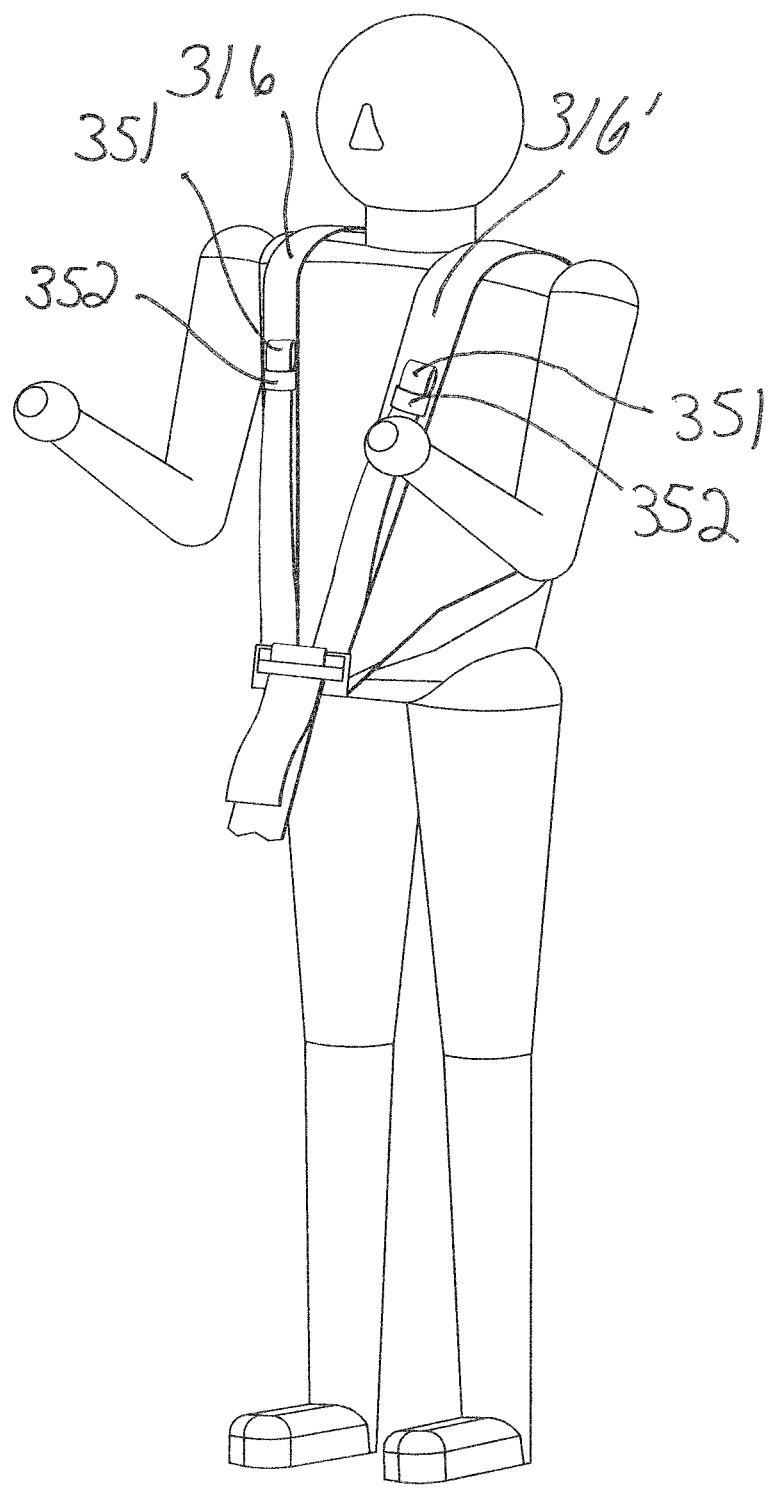
FIG. 17 is a front perspective view of the system of FIG. 16 with the arm loops stowed away in a storage position.
Figure 18A:
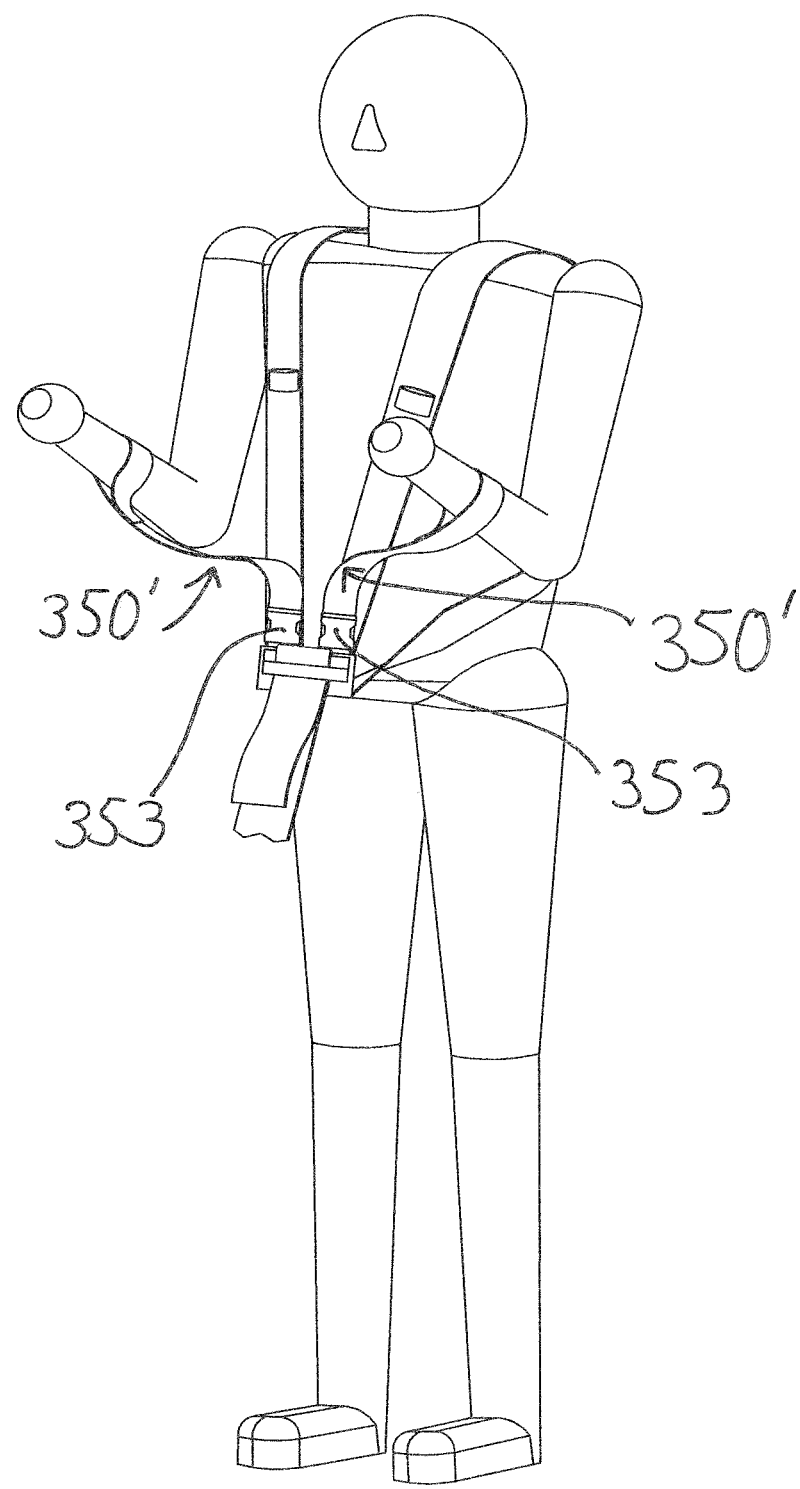
FIG. 18A is a front perspective view of a lifting harness system as in FIGS. 16 and 17, except that the arm looks comprise an embodiment of a detachment system.

The right and left arm loops preferably each comprise a single loop 351 (or, a single "aperture") at the end of the arm loop 350, through which the user extends his/her right and left forearms. The arm loops 350 may be storable (stowable), for example, by holding the arm loops 350 against the shoulder harness 3010 out of the way when not in use. Stow-loops 352, or other fasteners on the harness, may be used to hold each arm loop 350 in a position close to, and preferably generally parallel to, its respective shoulder loop 316 or 316', as shown in FIG. 17. Also, or alternatively, the arm loops 350 may be detachable for cases wherein the user does not foresee the need for the arm-loops 350. For example, in FIG. 18A, the arm loops 350' may be detached at snap-disconnectors 353 preferably at or near the lower end of the arm loops closest to the buckle. This way, once the arm loops are disconnected, there is no or little structure of the arm loops left behind to dangle or get in the user's way.

The arm loops, whether or not they are detachable and whether or not they are stowable, are preferably adjustable in total arm loop 350 length, for different users and different tasks, including for lifting to platforms, truck-beds, loading docks, landings, and other surfaces of various heights. See two, but not the only, length adjustment systems 355, 360 schematically portrayed in FIGS. 18B and 18C. It is very desirable to be able to adjust the length of the arm loops in advance of lifting, but the preferred systems are adapted so that the user need not necessarily remove his/her arms from the arm loops to do so. Certain of the adjustment systems, therefore, allow the user to grasp the fastener/adjuster, and/or the strap(s)/end(s) fastened/held therein, to do the adjustment while the harness system is on the person and/or while the arms are in the arm loops. Also, it is preferred that continuous rather than incremental length adjustment of arm loop length is provided, for example, by a sliding or infinitely adjustable fastener/adjustor (that is, infinitely and continuously along a certain length of the arm loop strap) be provided rather than by an incremental fastener/adjustor such as hole-and-pin system or multiple ring/aperture system. It is also desired that the arm loops be large enough for a user to comfortably slide at least his hands and forearms into and through the apertures of the arm loops. Preferably, the aperture of each arm loop, in use, encircles the forearm of the user, but there may be multiple positions for the aperture/ring of the arm loop that are comfortable and effective for the wearer.

Figure 18C:
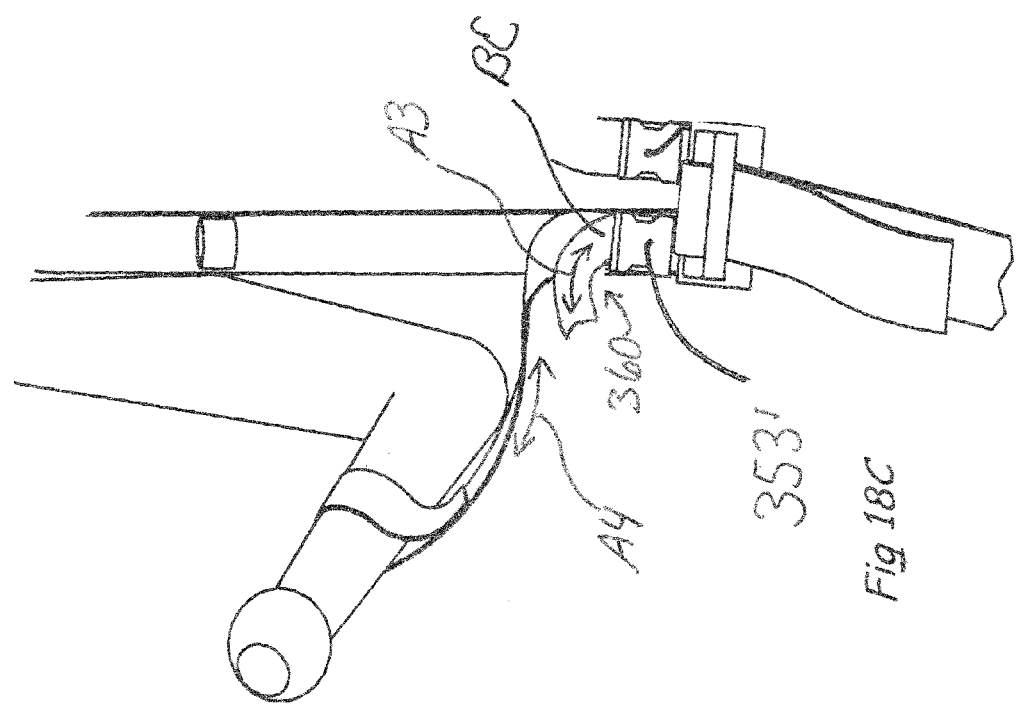
FIG. 18C a detail of a portion of a lifting harness as in FIG. 18A, with an added feature incorporated into the detachment system to allow adjustment of length of the arm loop.
Figure 18B:
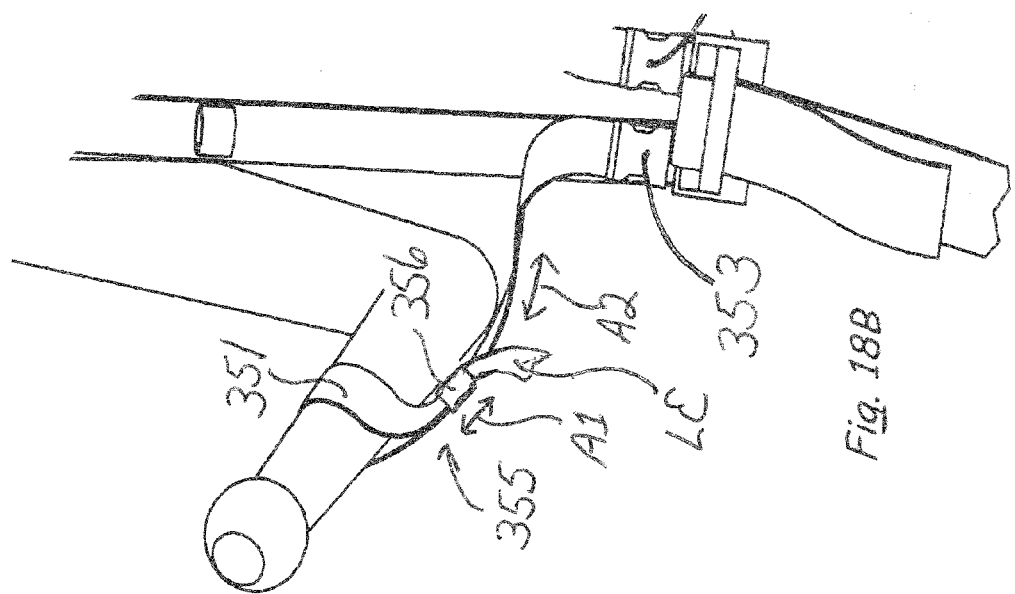
FIG. 18B is a detail of a portion of a lifting harness as in FIG. 18A, with an added feature for adjustment of length of the arm loop.

The adjustment system 355 in FIG. 18B is adapted for pulling the end EL of the strap forming the single loop 351 to be closer to the buckle 318, and anchoring/fastening the end LE at that position/length, in effect shorting the total length of the arm loop 350 as measured from its connection to the buckle (or to the harness near the buckle) to the farthest extremity of the single loop 351. Note that schematic FIG. 18B illustrates how both the strap end LE of the single loop 351 (at arrow A1) and the main portion of the arm loop strap (at arrow A2) can be slidable/adjustable in or relative to a fastener/adjuster 356, for adjustment of the overall arm loop length in effect by moving the single loop 351 closer to the buckle. This adjustment is one example of an adjustment system that may also comprise changing the diameter of the single loop 351, if desired, as will be understood from the drawing.

The adjustment system 360 in FIG. 18C is adapted for pulling/adjusting the opposite end BE of the strap, at or near buckle 318, and anchoring/fastening the strap end at that position/length, in effect shorting the total length of the arm loop 350 as measured from its connection to the buckle (or to the harness near the buckle) to the farthest extremity of the single loop 351. Note that schematic FIG. 18C illustrates how both the strap end BE (at arrow A3) and the main portion of the arm loop strap (at arrow A4) can be slidable/adjustable in or relative to the snap-disconnect-adjustor 353' for adjustment of the overall arm loop length, in effect by shortening the region of the arm loop strap between the single loop 351 and the buckle 318. Those of skill in strap fastening and adjusting will understand that various fasteners and adjustors, instead of or in addition to, the device shown as 353' can be used to adjust the overall length of the arm loops. The adjustment in FIG. 18C is an example of a length adjustment that will not change the diameter of the single loop 351, as will be understood from the drawing.

Note that length adjustments as discussed herein and as will be understood from this discussion, are the preferred way of adapting the arm loops 350 for various users and various loads and situations. It is preferred that only a single loop 351 or other single aperture in the arm-operated apparatus, is provided for each of the user's hands/arms, as such a simple and effective arm loop structure is especially effective and safe and easy to use, especially when the length of the arm loop structure, and/or the single loop/aperture diameter, may optionally be adjustable.

In use, the system 3000 may be used in various ways. For example, several preferred ways of carrying and maneuvering a lifted object LO are illustrated by FIGS. 19, 20A, 20B and 21.

Figure 19:
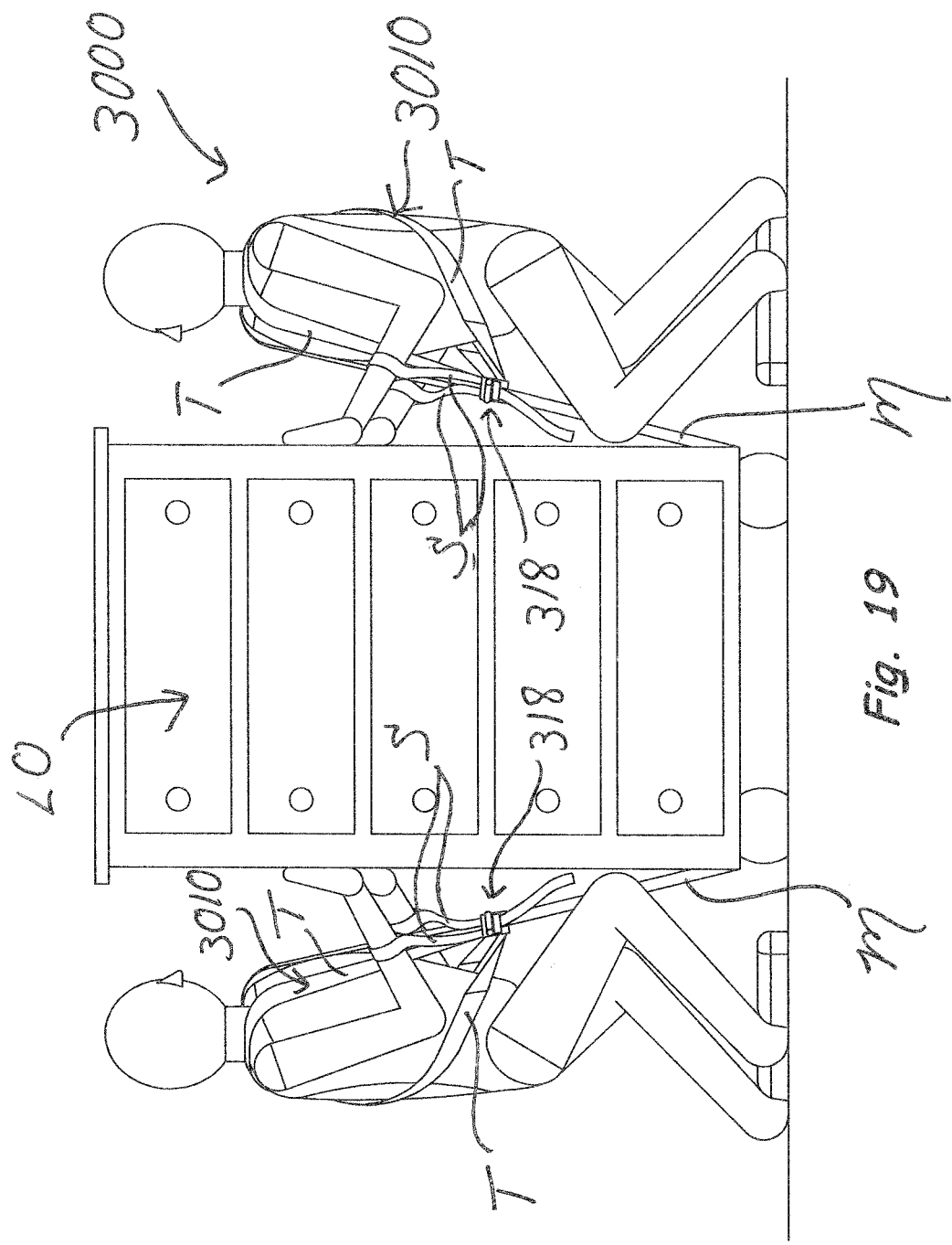
FIG. 19 is a side view of two users using an embodiment of lifting harness system, each harness having two arm loops as in FIG. 16, to lift a dresser, wherein the users have just started to lift the dresser.

The system 3000 may be used to lift entirely (and solely) with the central lift strap, rather than with the arm loops, in which case the arms in or out of the arm loops 350 can stabilize the lift object but not bear any of the weight (or any significant part of the weight) of the lifted object LO. In such an operation, as illustrated by FIG. 19, the force caused by the weight of the lifted object LO is born by preferably a single central lifter strap 20 main body M, wherein the strap main body M, and therefore the weight, is carried by the buckle 318 and the shoulder harness 3010. In FIG. 19, the buckle, and therefore said weight of the lift object, is carried by the shoulder harness 3010, rather than the arm loops even though they are around the users' arms. This is because the users have chosen not to lift their arms to the extent wherein the arm loops 350 would be taught and would be holding/carrying at least some of the weight of the buckle/strap/lifted-object. In FIG. 19, note that the arm loops 350 are slack (see slack areas S) and not carrying any of the weight of the strap main body M or the lifted object LO; instead, the shoulder harness 3010 is taught (See T in FIG. 19) and the strap M and buckle 318 are pulling down the front of the shoulder harness 3010 under said weight. In such an operation, the users could opt to remove their arms from the loops or optionally detach the arm loops from the system 3000, but it is preferred to retain the arm loops on their arms for the case and the time when the arm loops are needed to share part or all of the load.

Figure 20A:
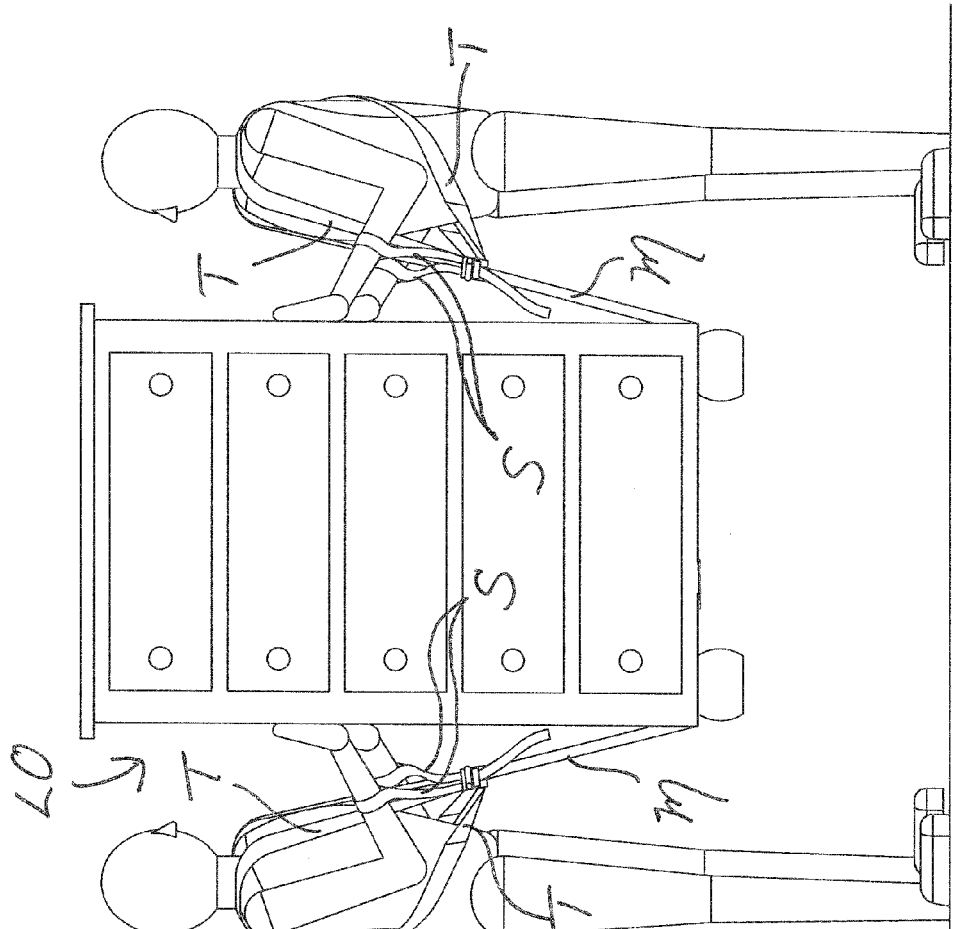
FIG. 20A is a side view of the two users and lifting harness system as in FIGS. 19, wherein the users have stood up and the users are carrying the weight of the dresser via the central lifter strap and shoulder harnesses, rather than via the arm loops.
Figure 20B:
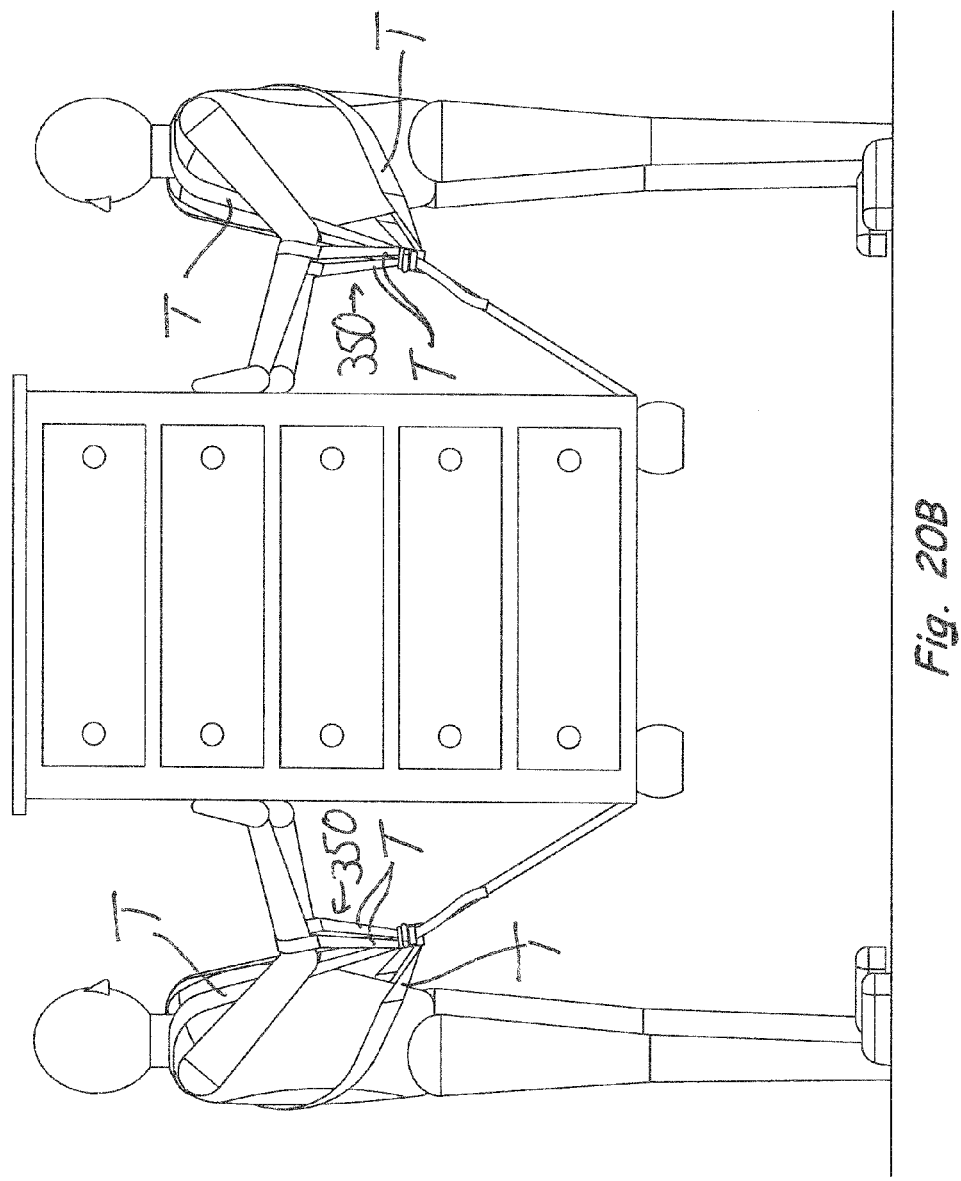
FIG. 20B is a side view of the two users and lifting harness system as in FIGS. 20A, but wherein the users are carrying the weight of the dresser via the central lifter strap and shoulder harnesses, and also by the arm loops.

The users' arm positioning, and the length of the arm loops, affect whether the arm loops carry weight and what part of the weight they carry. In FIG. 20A, the users have stood up straight, and the weight remains on the strap main body M, the buckle 318, and the shoulder harness, and hence on the users' shoulders and back. While the users are stabilizing the lifted object with their hands, the arm loops in FIG. 20A are still slack (see slack S) and are not carrying LO weight. In FIG. 20B, the users have stood up straight and have chosen to position themselves (typically farther from the lifted object) and to lift their arms, to an extent that the arm loops 350 as well as the shoulder harness are taught (see T), and are carrying some of the weight of the lifted object LO via their connection to the buckle or to the harness near and above the buckle. Thus, in FIG. 20B, the weight of the lifted object is carried via two systems that carry the buckle (here, both the harness and the arm loops) and so one may say that the load is shared by the two systems.

Figure 21:
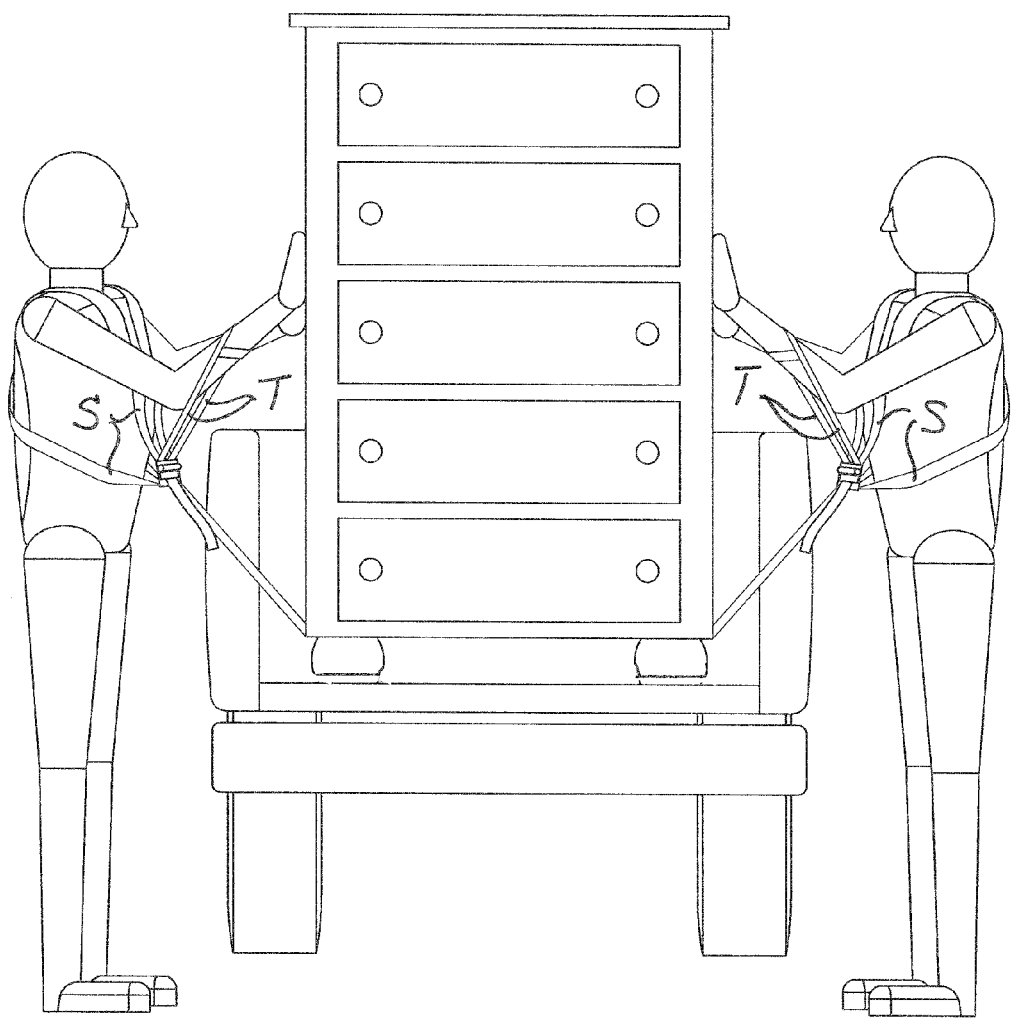
FIG. 21 is a side view of the two users and lifting harness system of FIGS. 19, 20A and 20B, wherein the users have moved their arms higher and straight, and therefore have moved the arm loops higher, to pull the buckle, the central lifter strap, and hence the dresser, higher than possible without the arm loops, to place the dresser in a truck bed.

In FIG. 21, the users have lifted their arms further as they lift the object LO up high into a pickup truck bed. This technique may be very useful for lifting to relatively high locations, such as a truck bed, a loading dock, or a landing that requires more feet of lift than possible with the lifter strap and shoulder harnesses alone. The extra leverage, power, and beneficial positioning and control afforded by the arm loops can make the system/device optimal for an increased number of scenarios and users, including for shorter people or people who are more comfortable using their arm strength than mainly or only their leg and torso strength. This places the weight entirely on the arm loops rather than on the shoulder harness, as can been seen by the taught T arm loops raising the buckle, and the shoulder harness being slack S. The arm loops 350, therefore, allow the users to lift the buckle, and hence the strap main body M and the lifted object LO, higher than if only the shoulder harness is used, due to the arms being raisable far above the lower belly/torso of the user when the buckle resides when supported only by the harness. During this operation, the hands of the user, even in FIG. 21, can still stabilize the lifted object, while the arms are also supporting a lot of weight via the arm loops.

The relative positions of the buckle and the arm loops, the connection of arm loops to the buckle or to the harness near the buckle, and the position of the buckle on the user's body, are important in preferred embodiments for optimal operation and flexibility and safety in operation. The lower end of the front portions of the shoulder harness, and the buckle, are preferably at or near, and centered on/against, the lower belly/torso, so that the preferred single buckle, the central lifter strap, and the arm loop connections to the buckle is also at or near, and centered on/against, the lower belly/torso. This translates to said single buckle, central lifter strap, and arm loop connections being also at or near, and centered on/against, the front lower region of the harness, half way or about half way between the right and left extremities of the harness. It is also important in many embodiments that the arm loops attach to the buckle (or to the harness) at the buckle or slightly above the buckle, with the preferred attachment being at the buckle or at most 3 inches above the buckle. Thus, the arm loops are preferably not attached to the harness on the lower portions of the shoulder loops, that is, not attached to the harness below, and not below and behind, the buckle. The arm loops are also preferably not attached directly to the central lifting strap or any lifting strap that contacts the lifted object.

The preferred placement and attachment of the arm loops as discussed herein has been found to be surprisingly beneficial and effective for operation, stability, controllability, and safety, for example, a significant improvement compared to any arm loop system that attaches right or left of front-center on a harness, and/or below the point of attachment of a lifting strap to the shoulder harness, and/or directly to a lifting strap extending around/underneath or otherwise directly contacting the lifted object. In many embodiments, it is has been found that attaching both arm loops to the same, single buckle, or within about 5 inches or less (preferably within 3 inches or less, and most preferably within 2 inches or less) above the buckle where the harness straps are secured, stable, and substantially non-moveable (or entirely non-moveable) relative to the buckle, is also surprisingly beneficial and effective for operation, stability, controllability, and safety, especially when compared to any arm loop system that attaches arm loops to right or left portions of a harness at right and left connection points that are distanced from each other more than 5 inches (or more than 3 inches, or more than 2 inches, in certain embodiments). In many embodiments, it is has been found that attaching both arm loops to the same, single buckle, or to the harness at connections points that are at most 5 inches (and preferably at most 3 inches) from each other during the entire operation and use of the device, is especially beneficial. For example, if the arm loops are attached to the buckle at or near the right and left extremities of the buckle, the arm loops at the buckle are distanced, at their connections to the buckle, at most a distance equal to the width of the buckle. For example, if the buckle is at most 5 inches wide, the arm loops, at their connections to the buckle, will be at most 5 inches apart.

Although this disclosed technology has been described above with reference to particular means, materials, and embodiments, it is to be understood that the disclosed technology is not limited to these disclosed particulars, but extends instead to all equivalents within the scope of the following claims.

I claim:

1. A lifting harness system comprising:
    a shoulder harness for being worn on shoulders of a user and extending forward to a front and central region of the user's torso, the shoulder harness comprising a right and a left shoulder loop each having a rear potion and a front portion;
    a single buckle attached to the front portions of the right and left shoulder loop, for being worn at said front and central region of the user's torso, wherein the single buckle comprises a rear member, a rigid lower loop having two ends fixed to the rear member, and an upper loop comprising flexible ends connected to the rear member above said lower loop and a middle loop portion;
    a lifter strap installed in the single buckle and extending down away from the buckle for placement under an object to be lifted, wherein the lifter strap extends between the lower loop and upper loop and extends partially around the upper loop; and
    wherein, when the lifter strap is pulled down from the buckle by a weight of the object to be lifted, the lifter strap pulls the upper loop toward the lower loop by said flexible ends flexing, so that the lifter strap is pinched between said upper loop and said lower loop and is restrained in the single buckle.

2. The lifting harness system as in claim 1, wherein said rear member is a strap.

3. The lifting harness system as in claim 1, wherein said rear member comprises a strap and a reinforcement bar.

4. The lifting harness system as in claim 1, wherein said upper loop comprises a flexible fabric tube and the middle loop portion comprises a reinforcing rod in the flexible fabric tube.

5. The lifting harness system as in claim 1, wherein the upper loop and the lower loop are spaced-apart slightly more than the thickness of the lifter strap.

6. The lifting harness system as in claim 1, further comprising two arm loops connected to the buckle, each having an aperture at an outer end of the respective arm loop for receiving an arm of the user.

7. The lifting harness system as in claim 6, wherein the arm loops are detachably connected to the buckle.

8. The lifting harness system as in claim 6, wherein the arm loops are adjustable in length.

9. The lifting harness as in claim 6, wherein the arm loops are adapted to extend a distance from the buckle whereby the user pulls the arm loops up to lift up the buckle to carry at least a portion of the weight of the lifted object.

10. The lifting harness as in claim 6, wherein the arm loops are adapted to extend a distance from the buckle whereby the user pulls the arm loops up to lift up the buckle to carry the weight of the lifted object so that the shoulder loops do not carry the weight of the lifted object.

11. The lifting harness as in claim 6, wherein the buckle is 5 or fewer inches wide, the front portions of the right and left shoulder loop are connected to each other by the buckle so that said front portions are 5 inches or less distance apart from each other at the buckle.

12. The lifting harness system as in claim 1, further comprising two arm loops connected to the shoulder harness at or above the buckle, each having an aperture at an outer end of the respective arm loop for receiving an arm of the user.

13. The lifting harness system as in claim 12, wherein the arm loops are detachably connected to the shoulder harness.

14. The lifting harness system as in claim 12, wherein the arm loops are adjustable in length.

15. The lifting harness as in claim 12, wherein the arm loops are adapted to extend a distance from the shoulder harness whereby the user pulls the arm loops up to lift up the front portions of the shoulder loops to lift up the buckle to carry at least a portion of the weight of the lifted object.

16. The lifting harness as in claim 12, wherein the arm loops are adapted to extend a distance from the shoulder harness whereby the user pulls the arm loops up to lift up the front portions of the shoulder harness to lift up the buckle to carry the weight of the lifted object, so that none of the shoulder loops, except for the portion of the shoulder loops that is between the connection point of the arm loops to the shoulder loops and the buckle, carries the weight of the lifted object.

17. The lifting harness as in claim 12, wherein the buckle is 5 or fewer inches wide, the front portions of the right and left shoulder loop are connected to each other by the buckle so that the front portions are 5 inches or less distance apart at the buckle.

18. The lifting harness as in claim 6, wherein each arm loop has only one aperture for receiving an arm of the user.

19. The lifting harness as in claim 12, wherein each arm loop has only one aperture for receiving an arm of the user.

* * * * *